United States Patent
McCorkle

(10) Patent No.: US 7,292,622 B2
(45) Date of Patent: Nov. 6, 2007

(54) METHOD AND APPARATUS FOR RAKING IN A WIRELESS NETWORK

(75) Inventor: John W. McCorkle, Vienna, VA (US)

(73) Assignee: Freescale Semiconductor, Inc., Austin, TX (US)

(*) Notice: Subject to any disclaimer, the term of this patent is extended or adjusted under 35 U.S.C. 154(b) by 825 days.

(21) Appl. No.: 10/680,492

(22) Filed: Oct. 8, 2003

(65) Prior Publication Data

US 2004/0066842 A1 Apr. 8, 2004

Related U.S. Application Data

(60) Provisional application No. 60/416,519, filed on Oct. 8, 2002.

(51) Int. Cl.
 *H04B 1/707* (2006.01)
 *H04L 1/02* (2006.01)
(52) U.S. Cl. .................. 375/148; 375/150; 375/347
(58) Field of Classification Search ............... 375/147, 375/148, 150, 346, 347, 349; 370/335, 342, 370/441; 455/65, 63.1
See application file for complete search history.

(56) References Cited

U.S. PATENT DOCUMENTS 5,917,866 A * 6/1999 Pon ........................... 375/346
6,115,406 A * 9/2000 Mesecher .................. 370/335
6,233,272 B1 * 5/2001 Yugawa ..................... 375/148

* cited by examiner

*Primary Examiner*—Betsy L. Deppe

(57) ABSTRACT

A raking receiver is provided in a wireless network. The raking receiver includes an antenna, first through Nth wavelet forming networks, first through Nth weighting mixers, a summer, a path mixer, and a signal processing circuit. The antenna receives an incoming signal. The first through Nth wavelet forming networks produce first through Nth locally generated wavelets. The first through Nth weighting mixers multiply the first through Nth locally generated wavelets by first through Nth weighting values, respectively, to produce first through Nth weighted wavelets. The summer adds together the first through Nth weighted wavelets to produce a weighted correlation input signal. The path mixer multiplies the incoming signal with the weighted correlation input signal to produce a correlated signal. And the signal processing circuit receives the correlated signal and produces a digital bit value. N is preferably an integer greater than 1.

28 Claims, 16 Drawing Sheets

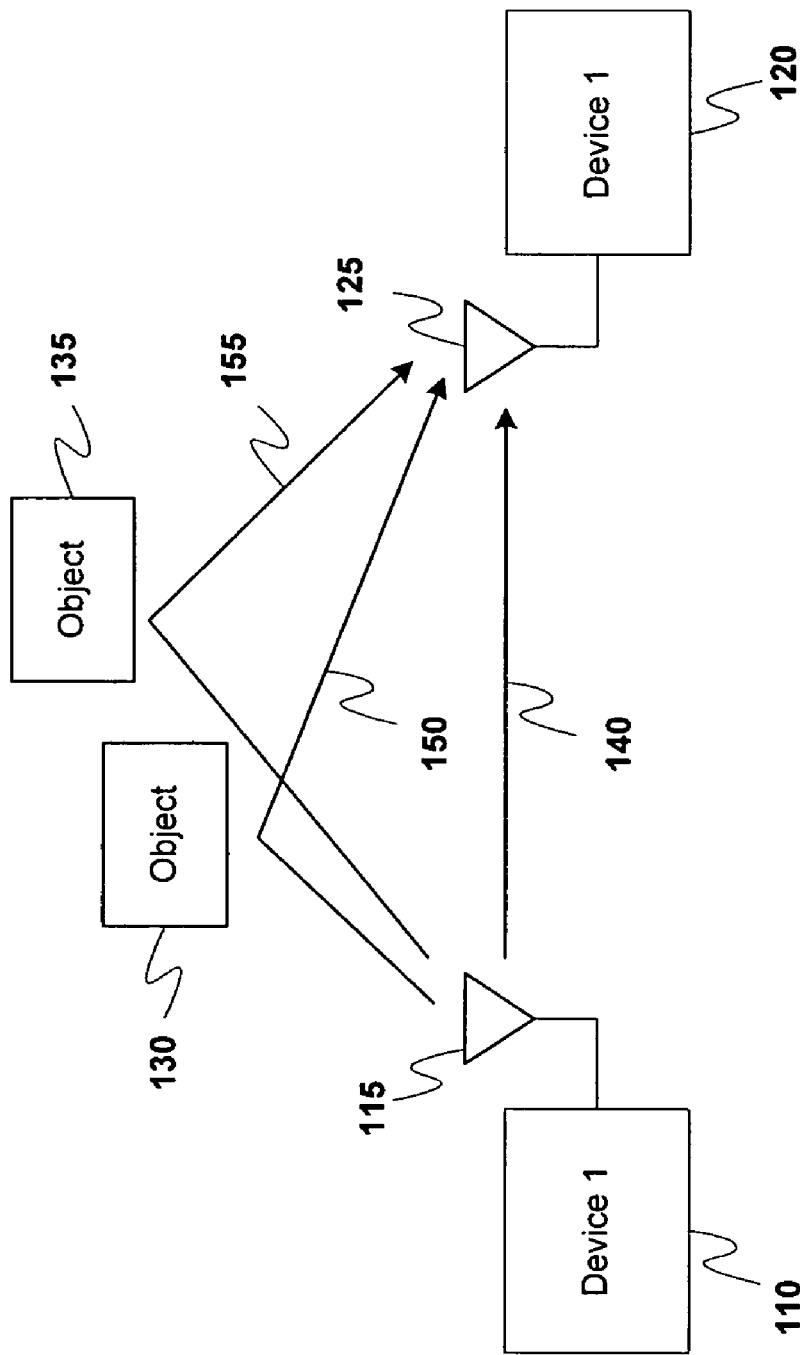

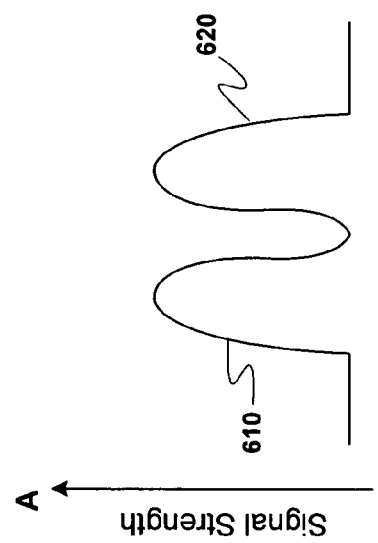
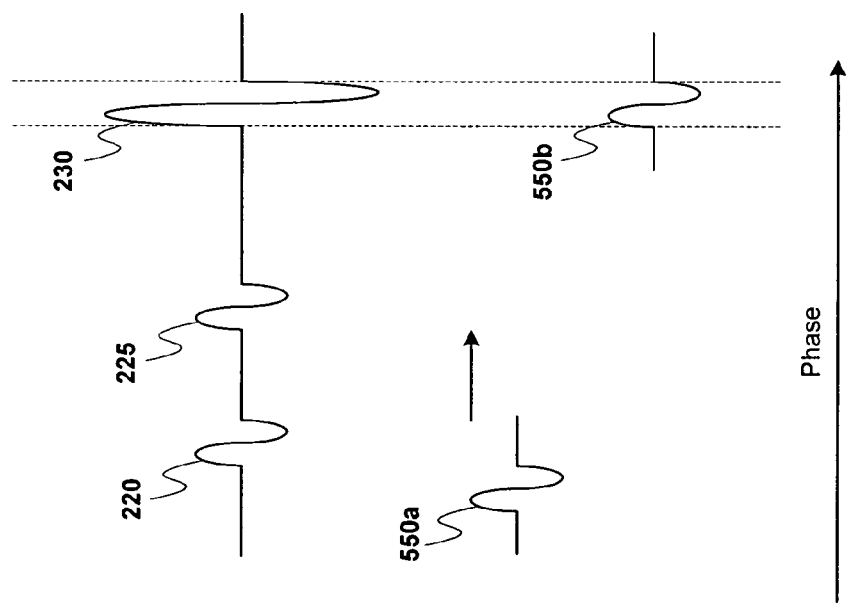
Fig. 6
Fig. 5

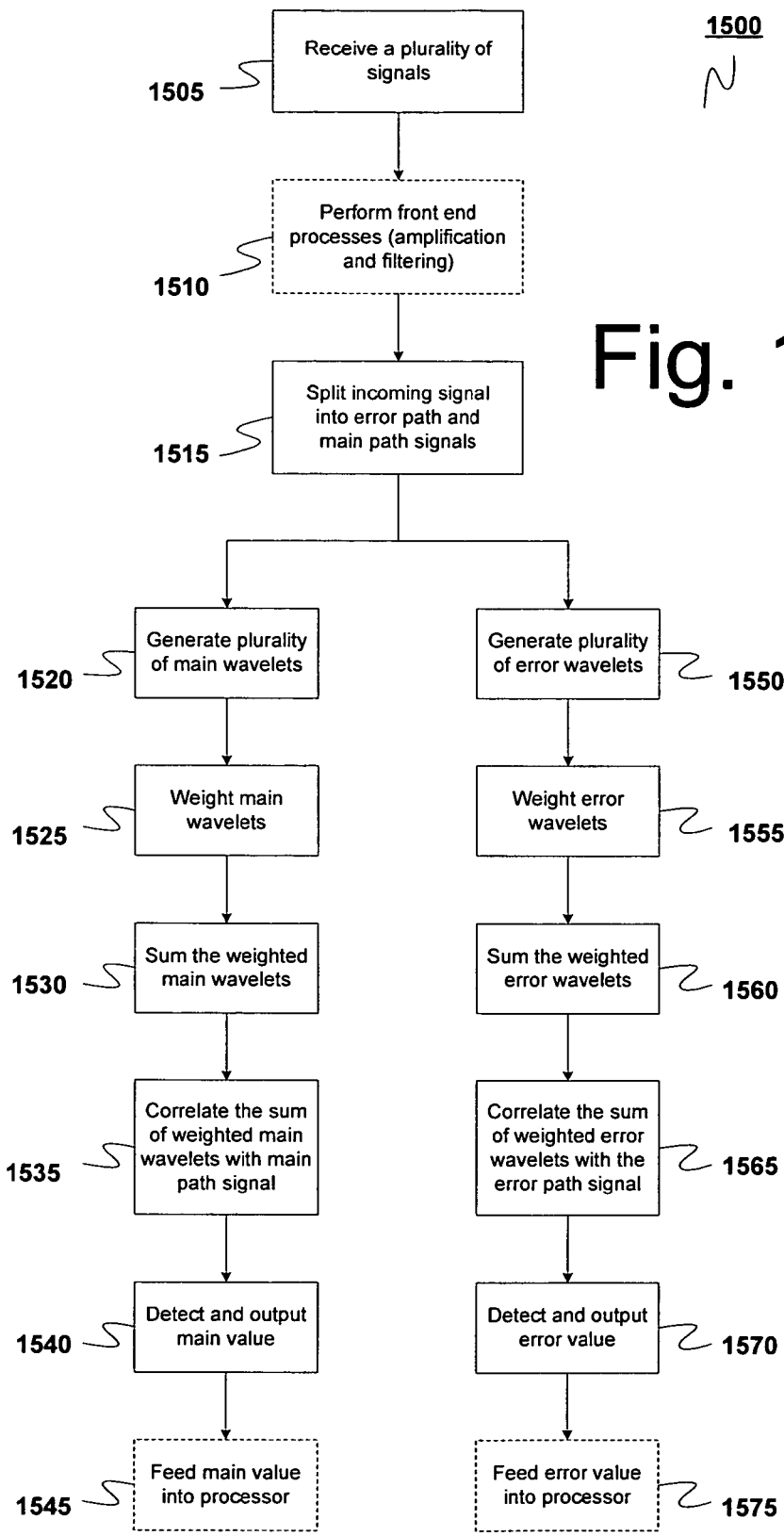

METHOD AND APPARATUS FOR RAKING IN A WIRELESS NETWORK

CROSS-REFERENCE TO RELATED PATENT DOCUMENTS

This application relies for priority on U.S. provisional application Ser. No. 60/416,519, by John W. McCorkle, filed Oct. 8, 2002, entitled "A METHOD OF ACQUIRING AN ULTRAWIDE BANDWIDTH SIGNAL," the contents of which is hereby incorporated by reference in its entirety.

The present document contains subject matter related to that disclosed in commonly owned, co-pending application Ser. No. 09/209,460 filed Dec. 11, 1998, entitled ULTRA WIDE BANDWIDTH SPREAD-SPECTRUM COMMUNICATIONS SYSTEM; application Ser. No. 09/972,966 filed Oct. 10, 2001, entitled ULTRA WIDE BANDWIDTH NOISE CANCELLATION MECHANISM AND METHOD; application Ser. No. 09/685,197 filed Oct. 10, 2000, entitled MODE CONTROLLER FOR SIGNAL ACQUISITION AND TRACKING IN AN ULTRA WIDEBAND COMMUNICATION SYSTEM; application Ser. No. 09/684,400 filed Oct. 10, 2000, entitled ULTRA WIDEBAND COMMUNICATION SYSTEM, METHOD, AND DEVICE WITH LOW NOISE PULSE FORMATION; application Ser. No. 09/685,195 filed Oct. 10, 2000, entitled ULTRA WIDE BANDWIDTH SYSTEM AND METHOD FOR FAST SYNCHRONIZATION; application Ser. No. 09/684,401 filed Oct. 10, 2000, entitled ULTRA WIDE BANDWIDTH SYSTEM AND METHOD FOR FAST SYNCHRONIZATION USING SUB CODE SPINS; application Ser. No. 09/684,782 filed Oct. 10, 2000, entitled ULTRAWIDEBAND COMMUNICATION SYSTEM, METHOD, AND DEVICE WITH LOW NOISE RECEPTION; application Ser. No. 10/214,183 filed Aug. 8, 2002, entitled MODE CONTROLLER FOR SIGNAL ACQUISITION AND TRACKING IN AN ULTRA WIDEBAND COMMUNICATION SYSTEM; and application Ser. No. 09/685,200 filed Oct. 10, 2000, entitled LEAKAGE NULLING RECEIVER CORRELATOR STRUCTURE AND METHOD FOR ULTRAWIDE BANDWIDTH COMMUNICATION, the entire contents of each of which being incorporated herein by reference.

BACKGROUND OF THE INVENTION

Most radios operate in multipath environments. In such multipath environments, more than one transmission path exists between the transmitter and receiver. Narrowband radios suffer in multipath environments due to frequency selective fading, which is caused by the different time delays on the various paths and the destructive combining of the signal from all the paths. Narrowband radios can employ rake receiver structures to combine signals from the multiple paths, but this is a difficult and expensive process since narrowband systems lack the time-domain resolution to easily resolve the multipath terms. Rake is a term used to describe the coherent combining of energy from a plurality of multi-path induced replicas of the desired signal.

By definition, however, ultrawide bandwidth (UWB) systems have high time-domain resolution, and thus can resolve multipath signals. High chipping rate UWB systems have the advantage of operating in quasi-stationary multipath environments where the multipath is changing much slower than the code duration.

A raking receiver is thus used when multiple paths exist between two radios. FIG. 1 is a block diagram of a wireless system having two radios in which there are multiple transmission paths between the two radios.

As shown in FIG. 1, the wireless system 100 includes first and second radios 110 and 120, having first and second antennas 115, 125, respectively. There is a direct line of sight path 140 between the two radios 110 and 120, but there are also indirect paths 150 and 155 caused by bouncing signals off of other objects 130, 135 in the area around the two radios 110 and 120.

As a result, if the first radio 110 sends a wavelet out of the first antenna 115, the second antenna 125 will receive a plurality of wavelets having an arbitrary spacing that correspond to that signal as it passes along one direct path signal 140 and multiple different reflected paths 150 and 155. And although FIG. 1 shows only two reflected signals 150 and 155 bouncing off of two objects 130 and 135, there can be many more reflections off of multiple other objects. In rooms you can have hundreds, even thousands, of reflections with all kinds of different reflected path lengths.

Furthermore, depending on the properties of each object 130, 135, the strongest signal received at the second antenna 125 may be a reflected signal 150, 155 rather than the direct signal 140. One reason for this is that there could be something collecting energy at one of the objects 130, 135 and focusing it towards the receiving antenna 125. Another reason that a reflected signal may stronger than a direct signal is that there could be multiple objects that cause reflections having the same reflected path length. For example, if path 150 has a length L1, path 155 has a length L2, and L2=L2, the path lengths will be exactly matched. Ma result of this, one wavelet will travel from the first antenna 115 along path 150 to the second antenna 125, and another wavelet will travel from the first antenna 115 along path 155 to the second antenna. But since the path lengths are the same, both wavelets will arrive at the second antenna 125 at the same time and they would add their strengths together. Therefore it's not necessary that the shortest path signal be the strongest one received at the receiver.

FIGS. 2A-2C are graphs showing examples of the strengths of received signals in a multipath environment. In particular, FIGS. 2A-2C show the strengths of signals received at the second antenna 125 when a single wavelet is output from the first antenna 115 and travels only along the three paths 140, 150, and 155 of FIG. 1.

As shown in FIG. 2A, three wavelets 205, 210, and 215 arrive when the paths 140, 150, and 155 are of different length and the signal strengths are about the same size. FIG. 2B shows three wavelets coming in 220, 225, and 230 where the paths 140, 150, and 155 are of different length and the signal strength of one path is much larger that the other paths. As a result, one of the wavelets 230 is larger than the other two. FIG. 2C shows only two wavelets 240 and 245 being received because the wavelets from the two reflection paths 150 and 155 have the same path length (i.e., $L_1=L_2$). As a result, the two reflected wavelets add their strength and so the second wavelet 245 in this instance is larger than the first wavelet 240 from the direct path 140.

SUMMARY OF THE INVENTION

Consistent with the title of this section, only a brief description of selected features of the present invention is now presented. A more complete description of the present invention is the subject of this entire document.

An object of the present invention is to maximize the amount of rake through multiple phases of an incoming signal, while minimizing the circuit complexity and power consumption.

Another object of the present invention is to provide signals for a signal correlation path and an error/tracking path within a rake channel with a minimum of circuitry and power consumption.

These and other objects are accomplished by way of a raking receiver in a wireless network. The raking receiver comprises: an antenna for receiving an incoming signal; first through $N^{th}$ main path wavelet forming networks for producing first through $N^{th}$ locally generated main wavelets; first through $N^{th}$ main path weighting mixers for multiplying the first through $N^{th}$ locally generated main wavelets by first through $N^{th}$ main weighting values, respectively, to produce first through $N^{th}$ main weighted wavelets; a main path summer for adding together the first through $N^{th}$ main weighted wavelets to produce a weighted main correlation input signal; a main path mixer for multiplying the incoming signal with the weighted main correlation input signal to produce a main correlated signal; and a main path signal processing circuit for receiving the main correlating circuit and producing a digital bit value, wherein N is an integer greater than 1.

The main path signal processing circuit may further comprise: a main path filtering circuit for filtering the main correlated signal to produce a main filtered signal; a main path analog-to-digital converter for converting the main filtered signal to a digital bit value; and a main path amplifier chain for amplifying the main correlated signal before it is provided to the main path filtering circuit.

The main path signal processing circuit may further comprise: a main path integrating circuit for integrating the main correlated signal to produce a main integrated signal; a main path analog-to-digital converter for converting the main integrated signal to a digital bit value; and a main path amplifier chain for amplifying the main correlated signal before it is provided to the main path integrating circuit.

The main path integrator may further comprise: a first integrator; a second integrator; and a third integrator; an input switch that can select one of the first, second, and third integrators to connect to the main path mixer; and an output switch that can select one of the first, second, and third integrators to connect to the main path analog-to-digital converter. In this case, for every integration period, the input switch preferably selects one of the first, second, and third integrators as an integrating integrator to integrate the main correlated signal, the output switch preferably selects one of the first, second, and third integrators as a holding integrator to output the main integrated signal, and one of the first, second, and third integrators preferably operates as a dumping integrator to dump any information it had previously stored. And for every integration period, the integrating, holding and dumping integrators are preferably each different ones of the first, second, and third integrators.

The phases of each of the first through $N^{th}$ main wavelets can preferably be independently varied by the first through $N^{th}$ main path wavelet forming networks, respectively.

The raking receiver may further comprise: first through $M^{th}$ error path wavelet forming networks for producing first through $M^{th}$ locally generated error wavelets; first through $M^{th}$ error path weighting mixers for multiplying the first through $M^{th}$ locally generated error wavelets by first through $M^{th}$ error weighting values, respectively, to produce first through $M^{th}$ error weighted wavelets; an error path summer for adding together the first through $M^{th}$ error weighted wavelets to produce a weighted error correlation input signal; an error path mixer for multiplying the incoming signal with the weighted error correlation input signal to produce an error correlated signal; an error path signal processing circuit for receiving the error correlating circuit and producing a digital error-tracking signal, wherein M is an integer greater than 1.

The error path signal processing circuit may further comprise: an error path filtering circuit for filtering the error correlated signal to produce an error filtered signal; an error path analog-to-digital converter for converting the error filtered signal to a digital bit value; and an error path amplifier chain for amplifying the error correlated signal before it is provided to the error path filtering circuit.

The error path signal processing circuit may further comprise: an error path integrating circuit for integrating the error correlated signal to produce an error integrated signal; an error path analog-to-digital converter for converting the error integrated signal to a digital bit value; and an error path amplifier chain for amplifying the error correlated signal before it is provided to the error path integrating circuit.

The error path integrator circuit may further comprise: a first integrator; a second integrator; a third integrator; an input switch that can select one of the first, second, and third integrators to connect to the error path amplifier chain; and an output switch that can select one of the first, second, and third integrators to connect to the error path analog-to-digital converter. For every integration period, the input switch preferably selects one of the first, second, and third integrators as a sample integrator to sample the error amplified signal, the output switch preferably selects one of the first, second, and third integrators as a hold integrator to output the error integrated signal, and one of the first, second, and third integrators preferably operates as a dump integrator to dump any information it had previously stored. And for every integration period, the sample, hold and dump integrators are preferably each different ones of the first, second, and third integrators.

The phases of each of the first through $M^{th}$ error wavelets can preferably be independently varied by the first through $M^{th}$ error path wavelet forming networks, respectively. Also, M may be equal to N.

An alternate raking receiver in a wireless network is also provided. This raking receiver comprises: an antenna for receiving an incoming signal; A wavelet forming circuit for producing first through Nth weighted main wavelets and first through Nth weighted error wavelets; A main path summer for adding together the first through Nth weighted main wavelets to produce a main correlation input signal; an error path summer for adding together the first through Nth weighted error wavelets to produce an error correlation input signal; a main path mixer for multiplying the incoming signal with the main correlation input signal to produce a main correlated signal; an error path mixer for multiplying the incoming signal with the error correlation input signal to produce an error correlated signal; a main path signal processing circuit for receiving the maim correlated signal and producing a digital bit value; an error path signal processing circuit for receiving the error correlating circuit and producing a digital error-tracking signal, wherein N is an integer greater than 1.

The main path signal processing circuit may further comprise: a main path amplifier chain for amplifying the main correlated signal to produce a main amplified signal; a main path integrator circuit for integrating the main amplified signal to produce a main integrated signal; and a main path analog-to-digital converter for converting the main integrated signal to the digital bit value.

The main path integrator circuit may further comprise: a first integrator; a second integrator; a third integrator; an input switch that can select one of the first, second, and third integrators to connect to the main path amplifier chain; and an output switch that can select one of the first, second, and third integrators to connect to the main path analog-to-digital converter. For every integration period, the input switch preferably selects one of the first, second, and third integrators as a sample integrator to sample the main amplified signal, the output switch preferably selects one of the first, second, and third integrators as a hold integrator to output the main integrated signal, and one of the first, second, and third integrators preferably operates as a dump integrator to dump any information it had previously stored. And for every integration period, the sample, hold and dump integrators are preferably each different ones of the first, second, and third integrators.

The error path signal processing circuit may further comprise: an error path amplifier chain for amplifying the error correlated signal to produce an error amplified signal; an error path integrator circuit for integrating the error amplified signal to produce an error integrated signal; and an error path analog-to-digital converter for converting the error integrated signal to the digital error-tracking signal.

The error path integrator circuit may further comprise: a first integrator; a second integrator; a third integrator; an input switch that can select one of the first, second, and third integrators to connect to the error path amplifier chain; and an output switch that can select one of the first, second, and third integrators to connect to the error path analog-to-digital converter. For every integration period, the input switch preferably selects one of the first, second, and third integrators as a sample integrator to sample the error amplified signal, the output switch preferably selects one of the first, second, and third integrators as a hold integrator to output the error integrated signal, and one of the first, second, and third integrators preferably operates as a dump integrator to dump any information it had previously stored. And for every integration period, the sample, hold and dump integrators are preferably each different ones of the first, second, and third integrators.

The phases of each of the first through $M^{th}$ error wavelets can preferably be independently varied by the first through $M^{th}$ error path wavelet forming networks, respectively.

A method of raking in a wireless network is provided. The method comprises: receiving a wireless signal; generating first through $N^{th}$ locally generated main wavelets; multiplying the first through $N^{th}$ locally generated main wavelets by first through $N^{th}$ main weighting values, respectively, to produce first through $N^{th}$ main weighted wavelets; adding together the first through $N^{th}$ main weighted wavelets to produce a main correlation input signal; and correlating the main correlation input signal with the received signal to produce a bit value, wherein N is an integer greater than 1.

The method may further comprise: generating first through $M^{th}$ locally generated error wavelets; multiplying the first through $M^{th}$ locally generated error wavelets by first through $M^{th}$ error weighting values, respectively, to produce first through $M^{th}$ error weighted wavelets; adding together the first through $M^{th}$ error weighted wavelets to produce a error correlation input signal; and correlating the error correlation input signal with the received signal to produce an error-tracking signal, wherein M is an integer greater than 1. M may be equal to N.

BRIEF DESCRIPTION OF THE DRAWINGS

A more complete appreciation of the invention and its many attendant advantages will be readily obtained as it becomes better understood with reference to the following detailed description when considered in connection with the accompanying drawings, in which:

FIG. 1 is a block diagram of a wireless system having two radios in which there are multiple transmission paths between the two radios;

FIG. 5 is signal graph of signals coming into the first channel of the receiver of FIG. 4A;

FIG. 6 is signal graph of signals being correlated by the main path of the first radio in FIG. 4A;

FIG. 15 is a flow chart of a raking method according to a preferred embodiment of the present invention.

DETAILED DESCRIPTION OF THE PREFERRED EMBODIMENTS

Figure 2A:
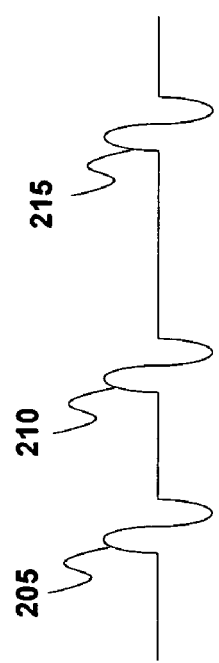
FIGS. 2A-2C are graphs showing examples of the strengths of received signals in a multipath environment.

Preferred embodiments of the present invention will now be described with reference to the drawings. Throughout the several views, like reference numerals designate identical or corresponding parts.

In operation a rake processor or rake receiver effectively turns two or more radios into one super high performance radio. Using the example of FIGS. 1 and 2B, the rake receiver could have three effective radios—one tuned to the first incoming wavelet 220 of FIG. 2A, one tuned to the second incoming wavelet 225, and one tuned to the third incoming wavelet 230—and coherently combine the outputs of all three radios so as to effectively receive a much better signal.

Figure 2B:
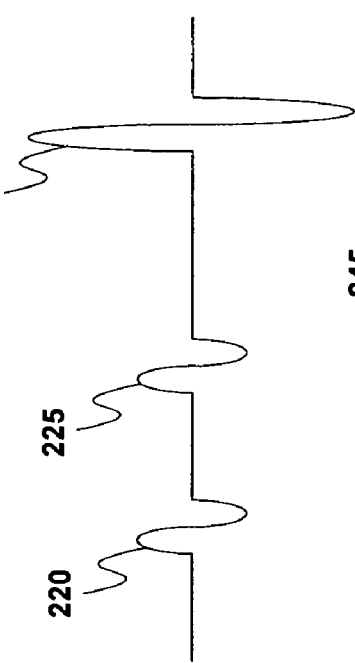
Figure 3:
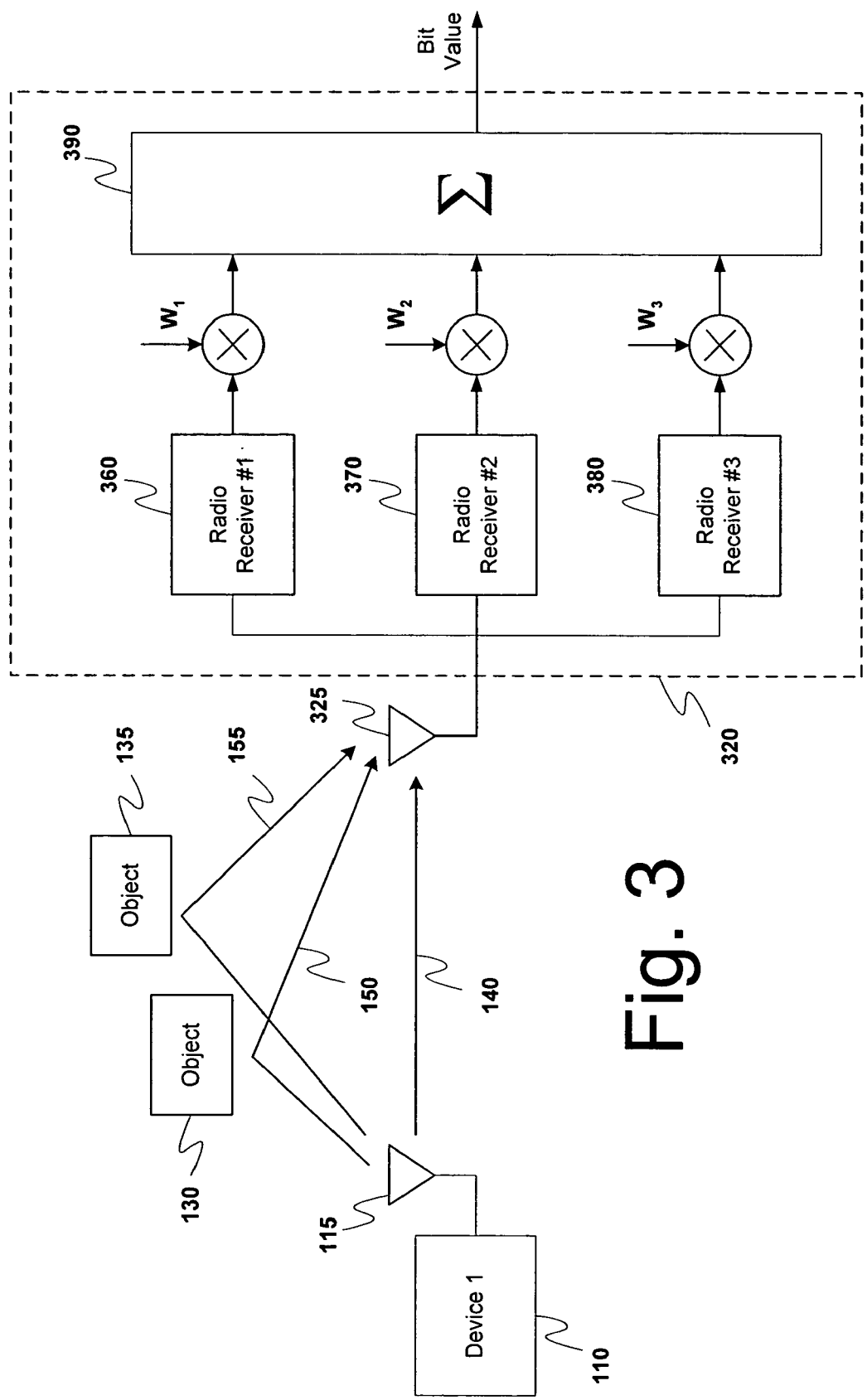
FIG. 3 is a block diagram of a wireless system including a rake receiver according to a preferred embodiment of the present invention.

FIG. 3 is a block diagram of a wireless system including a rake receiver according to a preferred embodiment of the present invention. As shown in FIG. 3, the raking receiver 320 includes first, second, and third radio receivers 360, 370, and 380, each sharing the same antennae 325. Each of the receivers 360, 370, 380 can be called a channel, a finger, or an arm in the rake correlator. In this preferred embodiment the antennae 325 is attached to the first, second, and third radio receivers 360, 370, and 380 in the raking receiver 320, each of which radio receiver is tuned to a specific wavelet 220, 225, and 230, respectively from FIG. 2B.

The first, second and third radio receivers 350, 360, 370 output first, second, and third output signals, respectively, which are then weighted by first, second, and third weight values $W_1$, $W_2$, or $W_3$, respectively. The weighted outputs are then added together in a summer 390, which outputs a final bit value.

The first, second, and third weights $W_1$, $W_2$, and $W_3$ used in the rake receiver 320 if FIG. 3 are used to account for the variance and phase of the signal. If a huge signal (i.e. with low variance or relatively low noise) is received at one receiver (e.g., the incoming wavelet 230 at the third radio receiver 380), that signal will be weighted very high (e.g., $W_3$ will be comparatively high). This higher weight indicates that the signal received at that particular radio receiver is more likely to be the correct signal, and the least likely to be corrupted by noise or interference.

The radio receiver with the highest weight will indicate the value of a received bit with the lowest error rate. The other radios 360 and 370 (which receive noisier signals and therefore have smaller weights $W_1$ and $W_2$ as compared to $W_3$) provide a bit value that has a higher likelihood of being in error. But if the system combines the three weighted signals, the combined result can be more accurate than just the output of any one of the radios by itself—even the radio with the lowest error.

In order to achieve this increased accuracy, the outputs of the radios 360, 370, and 380 are preferably weighted in inverse proportion to their variance. In other words, something of higher variance (e.g., wavelets 220 and 225) would be weighted less, while something of lower variance (e.g., wavelet 230) would be weighted more.

Although this preferred embodiment discloses three radio receivers, alternate embodiments could expand this to N radio receivers, where N is an integer greater than one. In this case each of the N receiver outputs will be weighted by a respective first through $N^{th}$ weight value $W_1$-$W_N$.

One problem with this design, however, is that it requires that the receiver to have N entire radios. For example, if a rake receiver of the sort shown in FIG. 3 were designed to rake sixteen terms, it would have to use sixteen separate radios, figure out the variance of each of the sixteen incoming signals, establish sixteen weights, and sum all sixteen weighted signals to achieve a final result. Larger raking numbers would require increased complexity.

Computing Variance and Weights

With respect to determining variance and weights, the receiver will preferably include a separate variance determining circuit that would determine the variance and the weights dynamically or at least partially dynamically. In other words, the circuit will preferably determine the variance for each incoming signal as it is received.

Some methods of determining variance are shown in: application Ser. No. 09/685,197 filed Oct. 10, 2000, entitled MODE CONTROLLER FOR SIGNAL ACQUISITION AND TRACKING IN AN ULTRA WIDEBAND COMMUNICATION SYSTEM; application Ser. No. 09/685,195 filed Oct. 10, 2000, entitled ULTRA WIDE BANDWIDTH SYSTEM AND METHOD FOR FAST SYNCHRONIZATION; application Ser. No. 09/684,401 filed Oct. 10, 2000, entitled ULTRA WIDE BANDWIDTH SYSTEM AND METHOD FOR FAST SYNCHRONIZATION USING SUB CODE SPINS; and application Ser. No. 10/214,183 filed Aug. 8, 2002, entitled MODE CONTROLLER FOR SIGNAL ACQUISITION AND TRACKING IN AN ULTRA WIDEBAND COMMUNICATION SYSTEM, all of which are incorporated by reference into the current application.

In the alternative, a variance determining circuit in the receiver could examine an incoming signal for some period of time, compute a variance, set a proper weight value, and then go to sleep for awhile. The weights can thus be set periodically in some embodiments because the variances for the various signals are unlikely to change very quickly.

One example of a partially dynamic weighting process is one that is performed on a packet-by-packet basis. The variance estimation and weight determining circuit operates during the preamble of the packet, and weights determined are used for the remainder of the packet. In other words, the variance and weight determination circuit could wake up when the preamble starts, listen to the incoming signal, calculate the variances, set the appropriate weights, and then leave the weight values unchanged for the entire data packet. For the duration of that packet, data will come in at each separate radio receiver (i.e., at each channel of the rake receiver) and will be weighted based on the variances determined at the beginning of the packet. Since packets are generally sent frequently (every 10's to 100's of a millionth of one second), the multipath appears stationary over the duration of the packet, so the ideal weights remain constant throughout the packet.

In alternate embodiments the device may update the weights less often, e.g., every P number of packets (where P is an integer greater than 1). After every P packets the device will re-estimate the variances and determine the appropriate weights. In between these P packets, the device simply freezes the weights at their current values.

The precise implementation of the variance determining circuit can depend upon how quickly the channel is expected to change. For example, if the first and second antennas 115 and 125 from FIG. 1 are on rooftops and the interfering structures 130, 135 are buildings, then the parameters of the channel would change very slowly, weeks to years (e.g., it might change if a building were torn down or another one erected). But if the devices 110 and 120 are handheld devices whose users are walking around a room, then the interfering structures 130, 135 may change quickly relative to the moving radios 110 and 120. Moreover, the interfering structures 130, 135 could also be moving (e.g., they could be other people.) causing the channel parameters to alter frequently. In this case it may be necessary to update the variances and weights every hundredth of a second.

Raking Receiver

Figure 4A:
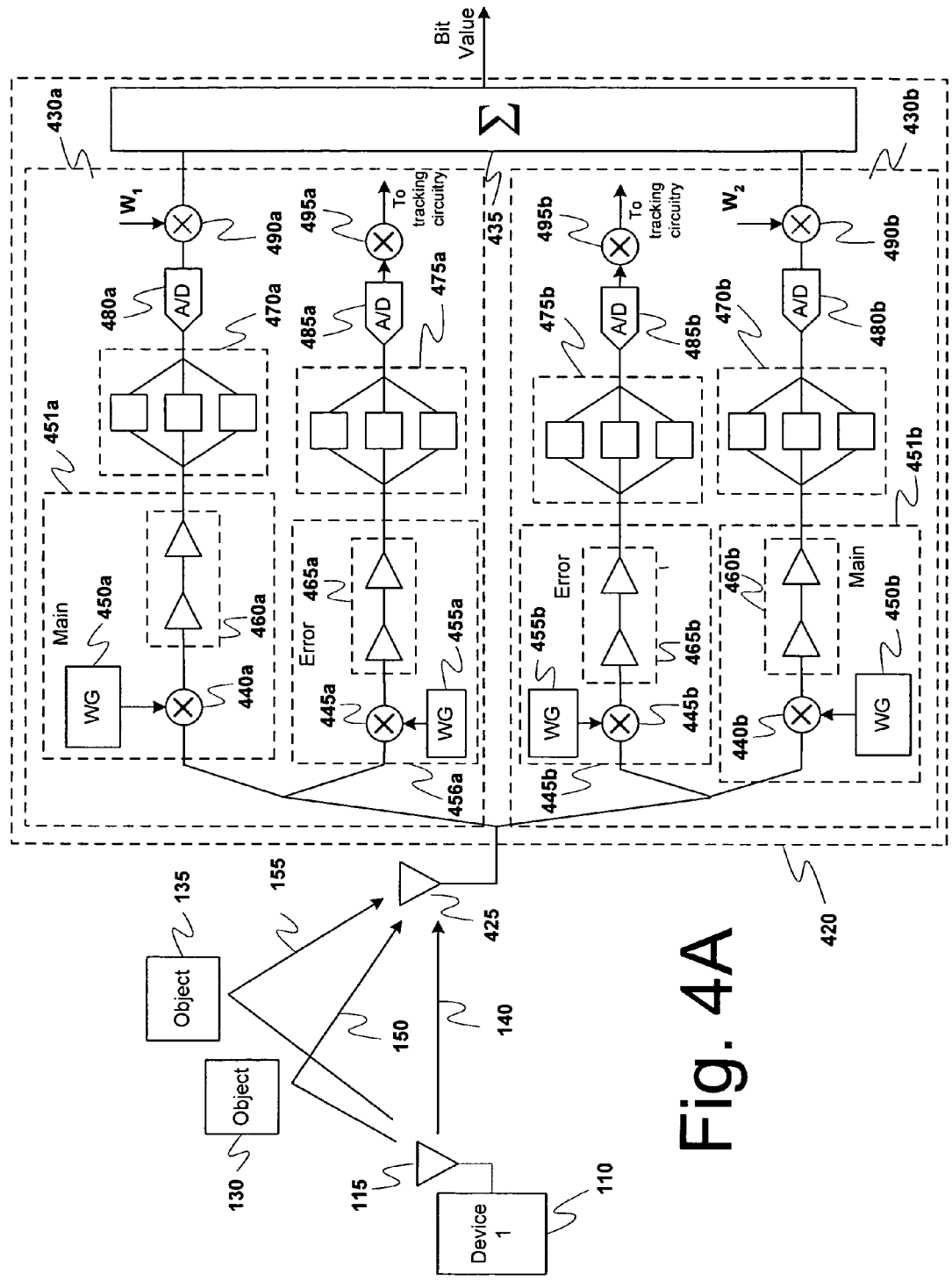
FIG. 4A is a diagram of a portion of a network including a rake radio.

FIG. 4A is a diagram of a portion of a network including a rake radio. As shown in FIG. 4A, the network includes a first device 110 having a first antenna 115 and a second device 420 having a second antenna 425. The second device 420 includes first and second radio receivers (also called channels, fingers, or arms) 430a and 430b, and a summer 435. The first radio receiver 430a includes a first main mixer 440a, a first error mixer 445a, a first main wavelet forming network (wave-generator) 450a, a first error wave-generator 455a, a first main amplifier chain 460a, a first error amplifier chain 465a, a first main integrate-hold-dump (IHD) integrator 470a, a first error IHD integrator 475a, a first main analog-to-digital converter (ADC) 480a, a first error ADC 485a, a first main weighting mixer 490a, and a first error weighting mixer 495a. The second radio receiver 430b includes a second main mixer 440b, a second error mixer 445b, a second main wave-generator 450b, a second error wave-generator 455b, a second main amplifier chain 460b, a second error amplifier chain 465b, a second main IHD integrator 470b, a second error IHD integrator 475b, a second main ADC 480b, second error ADC 485b, a second main weighting mixer 490b, and a second error weighting mixer 495b.

Some examples of designs for phase code demodulators 451a, 451b, 456a, 456b may be found in: application Ser. No. 09/209,460 filed Dec. 11, 1998, entitled ULTRAWIDE BANDWIDTH SPREAD-SPECTRUM COMMUNICATIONS SYSTEM; application Ser. No. 09/972,966 filed Oct. 10, 2001, entitled ULTRA WIDE BANDWIDTH NOISE CANCELLATION MECHANISM AND METHOD; application Ser. No. 09/684,400 filed Oct. 10, 2000, entitled ULTRAWIDEBAND COMMUNICATION SYSTEM, METHOD, AND DEVICE WITH LOW NOISE PULSE FORMATION; application Ser. No. 09/684,782 filed Oct. 10, 2000, entitled ULTRA WIDEBAND COMMUNICATION SYSTEM, METHOD, AND DEVICE WITH LOW NOISE RECEPTION; and application Ser. No. 09/685,200 filed Oct. 10, 2000, entitled LEAKAGE NULLING RECEIVER CORRELATOR STRUCTURE AND METHOD FOR ULTRA WIDE BANDWIDTH COMMUNICATION, all of which are incorporated by reference into the current application.

The first device 110 in FIG. 4A sends a signal to the second device 420 along a plurality of one or more signal paths, depicted as 140, 150, and 155. The receiving antenna 425 receives the incoming signal from all of the signal paths 140, 150, 155, splits it into two copies, and sends the incoming signal to each of radio receivers 430a and 430b, to both the main and error paths in each.

The raking receiver includes 2 or more channels. As shown in the preferred embodiment of FIG. 4A, the raking receiver 420 includes two channels: a first channel processed by the first radio receiver 430a, and a second channel processed by the second radio receiver 430b. By way of example, the following discussion will examine the operation of the first channel (run by the first radio 430a). The operation of the second channel (run by the second radio 430b) will be analogous.

In the first channel, the incoming signal comes in at the second antenna 425 and passes through the first dual phase code demodulator block 452a, into the first main phase code demodulator block 451a and the first error phase code demodulator block 456a. Here the incoming signal passes to mixers 440a and 445a. The first main wave-generator 450a, connected to the first main mixer 440, is clocked at or near the chipping rate of the incoming signal. While the clocking rate is near the chipping rate of the incoming signal, the wave-generator 450a scans through possible phases so that the first main path will find all of the incoming wavelets (e.g., as shown in FIGS. 2A-2C).

Figure 2C:
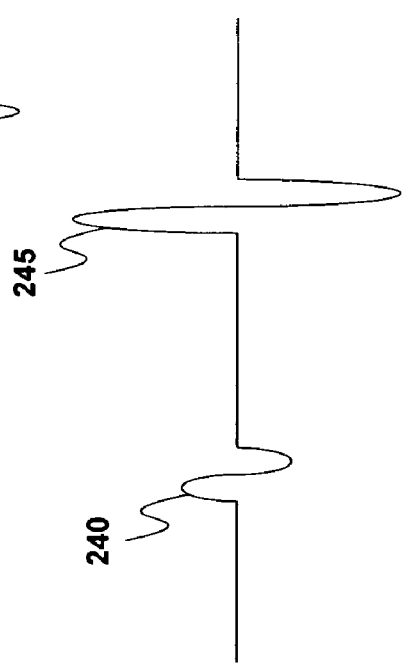

Having found the clock phase for each of the incoming wavelets, the first main wave-generator 450a and first error wave-generator 455a will clock at the phase that aligns the largest of the incoming signal wavelets and the wavelet from wave-generator 450 at mixer 440a so that the first channel 430a receives the energy from the largest wavelet in the incoming signal (e.g., signal 230 from FIG. 2B). First error wave-generator 455a generates a quadrature signal that is aligned with the incoming signal at mixer 445a so as to produce a null signal when the phase alignment is correct, and a plus or minus signal if the phase is early or late. The first radio 430a will then use the signal traveling on the error path (elements 445a, 455a, 465a, 475a, 485a, 495a) to track the phase and maintain the alignment of the incoming signal with the wavelet from wave-generator 450a at mixer 440a, and with the wavelet from wave-generator 455a at mixer 445a.

In some preferred embodiments, the various wave generators 450a, 450b, 455a, 455b can be pulse form generators, sine wave generators, or the like.

In a preferred embodiment, during a scanning process to find the phase for the plurality of multipath terms, each phase code demodulator 451a, 451b, 456a, 456b, can be run at phase offsets relative to each other in order to accelerate the search for the largest multipath terms.

FIG. 5 is signal graph of signals coming into the first channel of the raking receiver 420 of FIG. 4A. FIG. 6 is signal graph of signals being correlated by the main path of the first radio in FIG. 4A. As shown in FIG. 5, wavelets 220, 225, and 230 represent incoming wavelets, while wavelets 550a and 550b represent a wavelet generated by the first main wave-generator 450a at various phases (i.e., as the first main wave-generator 450a varies its phase).

When the wavelet initially generated by the main wave-generator 550a matches the phase of a wavelet received at the antenna (e.g., wavelet 550b matches phase with wavelet 230), the two wavelets 550b, and 230 will correlate at the first main mixer 440a as shown in FIG. 6.

During correlation of the incoming wavelet 230 and the locally generated wavelet 550b, the positive portion in the incoming wavelet 230 will combine with the positive portion in the wavelet 550b generated by the first main wave-generator 450a to make a positive signal 610. Likewise, the negative portion in the incoming wavelet 230 will combine with the negative portion in the wavelet 550b generated by the first wave-generator 450 to make a positive signal 620. As a result the first main mixer 440a will output a double-humped wavelet (wavelet 610 plus wavelet 620). Since this double-humped wavelet (wavelet 610 plus wavelet 620) is either all positive or all negative, when passed into integrator (like 470a in FIG. 4B) a DC value is produced that is proportional to the signal energy in the multipath term being received, and the polarity is consistent with the phase of the transmitted information (e.g. plus or minus for a digital one or zero). If the transmitter (110 of FIG. 4B) is transmitting a code sequence of phase modulated wavelets, where the code duration is N wavelets (N=1 or more), then the first radio can take the output of the integration of N wavelets and use it as the magnitude and phase (or polarity if it is bi-phase) of the signal.

This operation is performed along the main path in the first radio 430a. The incoming signal is passed to the first main mixer 440a, which correlates the incoming signal with the local signal generated by the first main wave-generator 450a. The result of this is sent through the fist amplifier chain 460a, through the first main IHD integrator, through the first main ADC 480a, and finally through the first main weighting mixer 490a (where it will be weighted by a first weighting value $W_1$). The result is then sent to the summer 345 where it is summed with the weighted result from the second radio 430b to produce a final value.

In some embodiments of an ultrawide bandwidth (UWB) radio, each transmitted bit is represented by a single wavelet. In this case, when the radio receives a single wavelet, it has received a transmitted bit. A UWB system generally has a very, very high spatial resolution because the wavelet is so short in time.

Furthermore, although FIGS. 2 and 5 show each of the signals being very clearly identifiable as separate wavelets, it is possible that wavelets from multiple paths could overlap one another. In this case the receiver would receive a different waveform that would be a composite of the wavelets. But when that happens, the resulting waveform will still correlate with the wavelet generated by the main wave-generator 450a, and therefore produce a useable output signal that corresponds to the phase of the information on the incoming signal.

As a result of this, the first and second channels (represented by the first and second radios 430a and 430b) will separately correlate with different multipath signals. For example, the first channel (i.e., the first radio 430a) might lock onto the third wavelet 230 of FIG. 2B, while the second channel (i.e., the second radio 430b) might lock onto the second wavelet 225 in FIG. 2B. Each radio 430a, 430b will then correlate and determine some value for the correlation (as shown in FIG. 6).

Figure 4B:
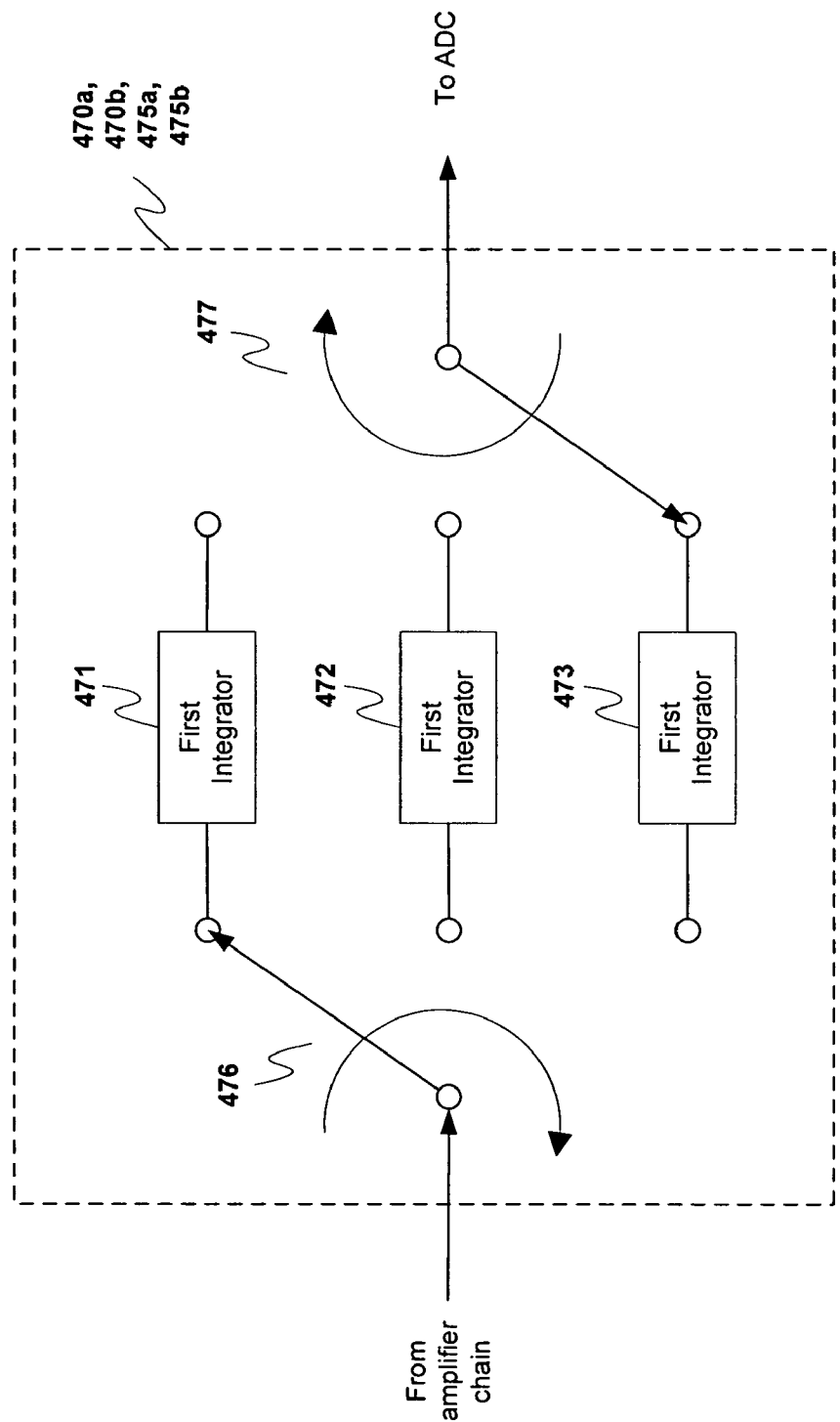
FIG. 4B is a diagram of an integrator circuit from the network of FIG. 4B according to a preferred embodiment of the present invention.

FIG. 4B is a block diagram of an integrator of FIG. 4A according to a preferred embodiment of the present invention. As shown in FIG. 4B, a preferred IHD integrator 470a, 470b, 475a, 475b comprises first, second, and third integrators 471, 472, 473, an input switch 476 that choose one of the first, second, and third integrators 471, 472, 473, and an output switch 477 that choose one of the first, second, and third integrators 471, 472, 473.

In the embodiment shown in FIG. 4A, each path of each of the channels has to have a phase-code demodulator (comprised of a wave generator, a mixer, an amplifier chain), an integrator, a one or more bit ADC, and a mechanism to weight the result. In the preferred embodiment (as shown in FIG. 4B), the integrator 470a, 470b, 475a, 475b may be comprised of an integrate-hold-dump (IHD) integrator that time shares three individual integrators 471, 472, 473 where one is integrating over the transmitted phase-code interval, while another is dumping (i.e. discharging to zero), while the remaining one is holding the result of the previous integration which is passed to the ADC to digitally capture the signal value. After each integration period, the functions of the three integrators rotate so the integrator that was holding, dumps; the integrator that was dumping, integrates; and the integrator that was integrating, holds.

The weighting can be done digitally, as shown in FIG. 4A with digital multiplier 490a, 490b, 495a, 495b. It can also be done within the analog processing with a variable gain and phase-reversal function within the amplifier chain 460a, 460b, 465a, 465b. Similarly, it could be done with a multiplying ADC. It could also be split where the gain is applied in one or more of the analog processing blocks, while the sign was applied in the digital blocks. To support either an error path, or a quadrature path to support QPSK, or M-ary PSK or M-ary QAM modulated wavelets, or FSK, each channel has to have two paths (i.e. two mixers, two amplifier chains, two integrators (IHD or otherwise), two ADCs, and two weighting mechanisms).

If an embodiment had sixteen channels (i.e. letters "a" through "p", each of these channel structures 430a-430p would have to have the above components be repeated, which would amount to thirty-two mixers, thirty-two amplifier chains, thirty-two integrators (ninety-six integrators if using IHD integrators), thirty-two ADCs, and thirty-two weighting mechanisms. Such a collection of components would use a lot of power and would take up a lot of space on a chip.

It would be desirable to minimize the number of components used for a rake receiver, however. This will keep the integrated circuit die size small, which will in turn reduce costs since die size is proportional to costs.

Raking Process

In the system disclosed in FIG. 4A, the raking process is performed as follows. The first device 110 sends a signal including multiple data bits to the second device 420. This signal travels along multiple paths (including a direct path 140 and a plurality of reflected paths such as 150, 155) and is received at the second device 420.

The received signal (including multiple reflected copies of the same signal) is split and sent to each channel (i.e., finger or arm) in the receiving (i.e., second) device 420. The $N_c$ channels are synchronized to correlate with the $N_c$ largest wavelet terms in the incoming signal. At this point, the first and second wave-generators 450a and 450b have different phases, e.g., the first wave-generator 450a may be timed at $T_1$, while the second wave-generator 450b may be timed at $T_2$. (This could be extended up to $T_{N_C}$ if $N_c$ channels were used.)

And as noted above, in this structure, the first main wave-generator 450a and the second main wave-generator 450b could be correlating on wavelets from different transmitted bits. For example, the first channel could be locking onto one wavelet (e.g., the third wavelet 230 from FIG. 2B), while the second channel might be locking onto a different wavelet (e.g., the second wavelet 225 from FIG. 2B).

Furthermore, the second wavelet 225 might be from a second data bit, while the third wavelet 230 might actually be from a first data bit. In other words wavelet 225 might come from path 140 while wavelet 230 might come from path 150 and the difference in path length could mean that different bits were received for each. For example, if the direct path 140 was very short and the first reflected path 150 was very long, a second wavelet 225 from a second data bit might arrive on the direct path 140 before a third wavelet 230 from a first data bit arrived on the first reflected path 150. In this way, the first bit could arrive at the second device after the second bit.

Therefore, it is necessary to identify which data bits each channel has correlated onto. In particular, when the second device 420 works to combine the results from the channels of the raking receiver, the wave-generators in each channel will need to know what signal corresponds to what bit.

More generally, the information is encoded in symbols that are comprised of a family of modulated wavelets which are modulated according to codes (also called code words). In this case, data bits are represented not by a single wavelet but by a sequence of wavelets. Each symbol may contain one or more bits of information. Each channel in the rake receiver (i.e., the fingers or arms) aligns to the sequence of wavelets in a symbol rather than just a single wavelet.

Once the first main wave-generator 450a and the second main wave-generator 450b are synchronized to the symbol, the resulting values that they produce can be weighted as discussed above with respect to FIG. 3. A similar process is performed for each error path so that each multipath term is tracked separately. Alternatively, the "error" path can be used as a quadrature channel to allow M-ary PSK or M-ary QAM to be decoded. Finally, the weighted results from each channel are added to determine a final value for the symbol that was sent.

First Alternate Raking Receiver

Figure 7:
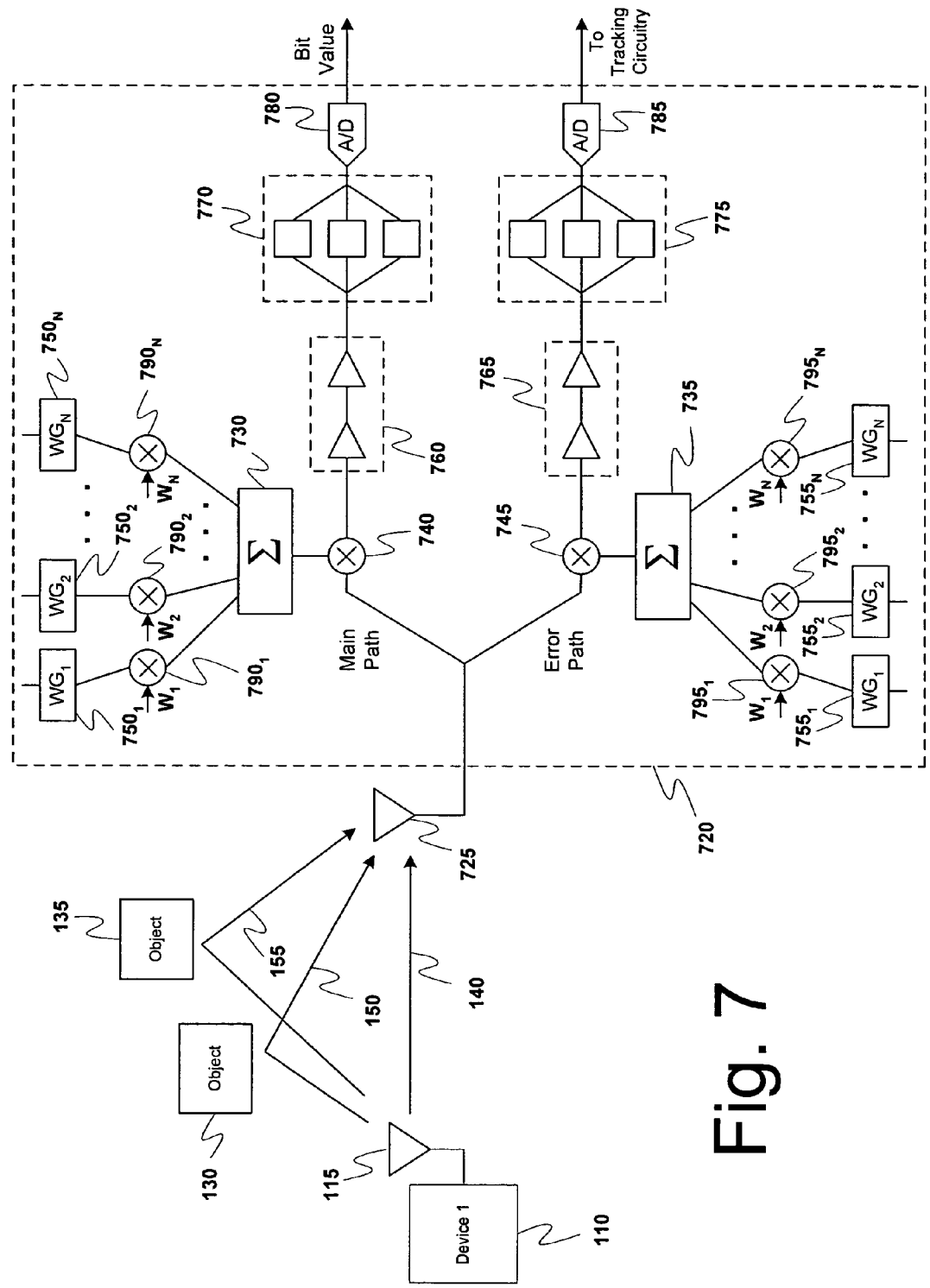
FIG. 7 is a block diagram of a wireless network including a rake receiver according to a preferred embodiment of the present invention.

FIG. 7 is a block diagram of a wireless network including a rake receiver according to a preferred embodiment of the present invention. As shown in FIG. 7, the network includes a first device 110 having a first antenna 115 and a second device 720 having a second antenna 725. The second device includes a single channel 720 that includes two paths, a main path and an error path, where these could also be called an in-phase path and a quadrature path. The paths are comprised of a main summer 730, an error summer 735, a main mixer 740, an error mixer 745, first through $N^{th}$ main wavelet forming networks (wave-generators) $750_1$-$750_N$, first through $N^{th}$ error wave-generators $755_1$-$755_N$, a main amplifier chain 760, an error amplifier chain 765, a main integrate-hold-dump (IHD) integrator 770, an error IHD integrator 775, a main analog-to-digital converter (ADC) 780, an error ADC 785, first through $N^{th}$ main weighting mixers $790_1$-$790_N$, and first through $N^{th}$ error weighting mixers $795_1$-$795_N$. Alternatively, the wave-generators could be amplitude controlled, eliminating the need for the weighting mixers. Similarly, the summing block could have independently weighted inputs, also eliminating the need for the weighting mixers. Thus, the rake receiver of FIG. 7 includes only a single radio receiver, but multiple wave-generators $750_1$-$750_N$ and $755_1$-$755_N$ and weighting mixers $790_1$-$790_N$, $795_1$-$795_N$, or simply multiple amplitude controlled wave-generators In this preferred embodiment, N can be any integer value greater than 1, and is preferably matched to the expected number of multipath terms found where the radio will be operating, which is generally between 2 and 32.

In operation, the first device 110 in FIG. 7 sends a signal to the second device 720 along a plurality of signal paths 140, 150, and 155. The receiving antenna 725 receives the incoming signal containing signals from all of the signal paths 140, 150, 155, and splits the received incoming signal, sending it to the main and error paths via the main and error mixers 740 and 745. Alternatively, these paths could be labeled in-phase and quadrature paths to support QPSK, or M-ary PSK or M-ary QAM.

The rake receiver of FIG. 7 uses a single radio to perform a rake function by having multiple wave-generators whose outputs are weighted (at the main and error weighting mixers $790_1$-$790_N$ and $795_1$-$795_N$) and summed (at the main and error summers 730 and 735) before the results are amplified, integrated, or converted from analog to digital signals. And despite the fact that this summing is done before all of these power consumptive steps, the resulting bit value output from the main ADC 780 can be nominally the same as the bit value output from the summer 435 of FIG. 4.

For each path (main and error, or in-phase and quadrature) in FIG. 7, there are N wave-generators $750_1$-$750_N$ or $755_1$-$755_N$, and N weights $W_1$ to $W_N$ applied through N weighting mixers $790_1$-$790_N$ or $795_1$-$795_N$, and a summer 730 and 735 to add the weighted wavelets together and supply the weighted and summed wave-generator value to the relevant mixer 740 or 745. The first through $N^{th}$ weights $W_1$ to $W_N$ are preferably the same weights that would have been put on the end of an N-arm receiver of the sort shown in FIG. 4. In other words, these are the weights for the correlation signal.

However, by placing the wave-generators $750_1$-$750_N$ and $755_1$-$755_N$, and weights on the wave-generator side of mixers 740 and 745, the raking receiver can eliminate the circuitry that would otherwise have to appear after these mixers in each of the channels. The embodiment of FIG. 7 avoids the need for this circuitry, leaving just two paths, where each has an amplifier, integrator, and ADC chain.

Consider a raking receiver as shown in FIG. 4. Each separate radio 430a, 430b in the second (receiving) device 420 requires two wave-generators, two mixers, two amplifier chains, two IHD integrators, two ADCs, two weighting circuits, plus the device 420 requires one summer 435 to sum the results from each radio receiver. If the device 420 had four arms it would require eight wave-generators, eight weighting mixers, eight signal mixers, eight amplifier chains, eight integrators (preferably IHD), eight ADCs, and one summer.

In contrast, if the device 720 had four arms it would require eight wave-generators and eight weighting mixers, but only two signal mixers (main and error), two amplifier chains, two integrators (preferably IHD), two ADCs, and two summers. A raking receiver as shown in FIG. 7 has a single radio with multiple wave-generators. Regardless of how many channels (i.e., fingers or arms) the second (receiving) device 720 uses, it will only have one pair of main and error paths including just two summers 730, 735, two mixers 740, 745, two sets of amplifier chains 760, 765, two IHD integrators 770, 775, and two ADCs 780, 785. The device 720 only adds two wave-generators, two signal mixers (main and error) for each added channel. Extended to N arms, the embodiment of FIG. 7 will always have the same number of wave-generators and weighting mixers (or amplitude controlled wave-generators), but only $(1/N)^{th}$ the number of main/error mixers, amplifier chains, IHD integrators, and ADCs.

Thus, while the embodiment of FIG. 7 does not reduce the complexity of the wave-generator structure (i.e., the agile clock), it does eliminate a great number of circuit elements, which can significantly reduce the cost of the device.

In operation, the second (receiving) device 720 performs multiple processing on the incoming signal, correlating and weighting it with multiple wave-generators at once. The signals stack on top of each other and are all mixed with the incoming signal at the same time. The result of this signal processing is the same as for the circuit shown in FIG. 4, except that actual processing of the signals is performed in a different order.

In alternate embodiments the receiving device 720 in FIG. 7 could process multipath wavelets in the incoming signal individually. In one particular alternate embodiment, the device 720 could turn off all of the wave-generators $750_1$-$750_N$, $755_1$-$755_N$ except for one in the main path and one in the error path. Each the clock on each wave-generator could then be scanned to find the largest wavelet in the incoming signal. One at a time, each wave-generator could scan for a correlated multipath term that most improves the SNR of the final output signal from the ADC.

Figure 8:
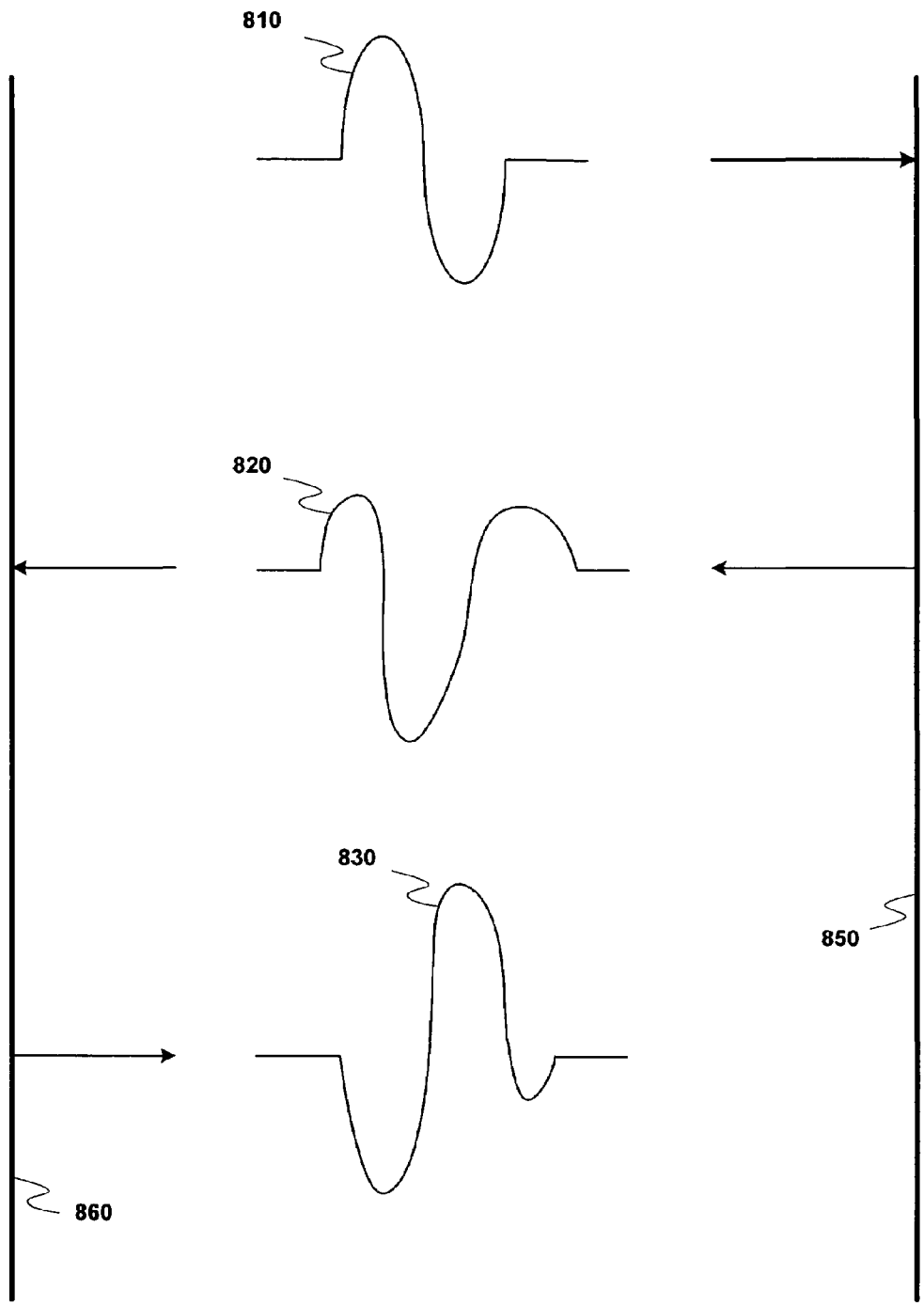
FIG. 8 is a graph of a wireless wavelet as it is reflected off of two surfaces in sequence.

Of course some of the reflected signals received at the device 720 will be non-inverted, and some will be inverted. This is because signals can be reversed when they are reflected. An example of this is shown in FIG. 8. As each wave-generator scans for a correlated multipath term, the correlation coefficient is either positive or negative, and is used to set the weight to positive or negative, which accounts for this multipath reversal.

Reflections

FIG. 8 is a graph of a wireless wavelet as it is reflected off of two surfaces in sequence. As seen in FIG. 8, a wavelet 810 is provided, e.g., sent from a first device 710. The wavelet 810 is then bounced off a first interfering object 850 (such as a first metal plate). The first reflected wavelet 820 that comes off of the first interfering object 850 is a derivative of the first wavelet 810 and looks very much like an upside down version of the initial wavelet 810 (although not identical).

If the second wavelet 820 bounces off of a second interfering object 860 (such as a second metal plate), it will reflect as a second reflected wavelet 830 that is the derivative of the second wavelet 820 and looks very similar to the original wavelet 810 (although not identical).

Wavelets that have bounced an even number of times (0, 2, 4, . . . ) can be called even bounce wavelets, while wavelets that have bounced an odd number of times (1, 3, 5, . . . ) can be called odd bounce wavelets. Because of this phenomenon, it is possible to tell a difference between an odd bounce wavelet and an even bounce wavelet because the waveforms are inverted on each odd bounce and are returned to their original polarity on each even bounce.

In the receiving device 720 of FIG. 7, the weights $W_1$ to $W_N$ applied to the signal output from the first through $N^{th}$ wave-generators can have their polarity adjusted to account for the polarity of the incoming signals. The normalized weights $W_1$ to $W_N$ vary between plus and minus one, with the values being one polarity for odd bounce wavelets and the other polarity for even bounce wavelets (e.g., negative for odd bounce wavelets and positive for even bounce wavelets) This allows the device 720 to receive signals no matter how many bounces they have. Thus, the waveforms output from the wave-generators $750_1$-$750_N$, $755_1$-$755_N$ will be properly correlated with the incoming signals at the mixers 440, 445, regardless of whether the incoming bits are odd bounce wavelets or even bounce wavelets. Since this is a completely coherent process, all of these signals will add coherently at the beginning of the path and will all be integrated as either all positive or all negative depending on whether the current symbol happens to be positive or negative.

As a result, the output of the main path ADC 780 should have a one polarity if the incoming symbol was a positive and the opposite polarity if the incoming bit was negative. The polarity corresponding to the output value will depend upon the polarity chosen for the weight values $W_1$ to $W_N$. But regardless, the output of the main ADC 780 is effectively a sign bit used for detection of the transmitted symbol. Preferably, when symbols are bi-phase modulated, the main ADC is arranged so that the least significant bit straddles a value of exactly zero, so that a decision is always made as to whether the symbol is detected as positive or negative.

Bit Values

Because reflections are properly accounted for, the output of the main ADC 780 will include sign and magnitude. These can be used for multiple purposes. They can be used in soft decision forward error correction decoders. They can also be fed into an equalizer circuit to mitigate interference from previous symbols that have traveled over longer multipath routes and arrive as interference, also known as inter symbol interference (ISI). In this way the receiver device 720 can have an equalization process based on the decisions at the main ADC 780.

Preferably, this is done in a post processing of the output data. The equalizer can also be allowed to alter the weighting values ($W_1$-$W_N$) used to weight the output of the wave-generators $750_1$-$750_N$, $755_1$-$755_N$ With the proper time shifts and weight adjustments the equalizer performance can be enhanced. In other words, rather than using one of the wave-generators $750_1$-$750_N$, $755_1$-$755_N$ to maximally correlate the current symbol coming in, the receiving device 720 can use them to minimize the interference from a previous symbols. The wave-generator essentially reverses the process it would use to correlate the current bit so as to destructively interfere with the the undesirable symbols in the incoming signal.

In this manner the receiving device 720 could also cancel out individual users through the use of codes. For example, if a first user has a first code, and a second user has a second code, the receiver device 720 could feed back the code for the second user so that one of wave-generators $750_1$-$750_N$, $755_1$-$755_N$ could cancel out the second user's signal when the receiving device 720 is looking for signals from the first user. This can effectively solve a multi-user detection problem. Thus multiple users can transmit and collide with each other in the air, but the receiver can null out all of the users but the desired user (e.g., in a two user system it can null the second user when it wants to receive from the first user and can null the first user when it wants to receive from the second user.)

By using one channel to listen to a desired user, and using a second channel to listen for a second user, the outputs of the two channels can be evaluated by a post processor to improve the performance of both channels. Detections from the first user can help the device 720 to cancel the first user's signal out from the second user's signal, and the detection from the second user can help the device 720 to cancel the second user's signal from the first user's signal, etc. In this way the receiving device 720 can effectively demodulate signals from all of the user's simultaneously, yet with much better results than a single channel could achieve.

Then, because the receiving device 720 knows the signals for all users (e.g., the first and second users in the above example), it can feed each back to the others to cancel them out for the user for whom interference need be eliminated. This process can significantly help increase the throughput of the device 720 because it can use the channel more effectively.

The preferred embodiment shown in FIG. 7 shows one way to process the signals using a reduced number of transistors and with reduced power consumption, as compared with the embodiment shown in FIG. 4. This is because the receiver 720 in FIG. 7 has the same number of wave-generators and weighting mixers as the receiver 420 in FIG. 4, but need only implement two amplifier-integrator-ADC paths.

Second Raking Receiver

Figure 9:
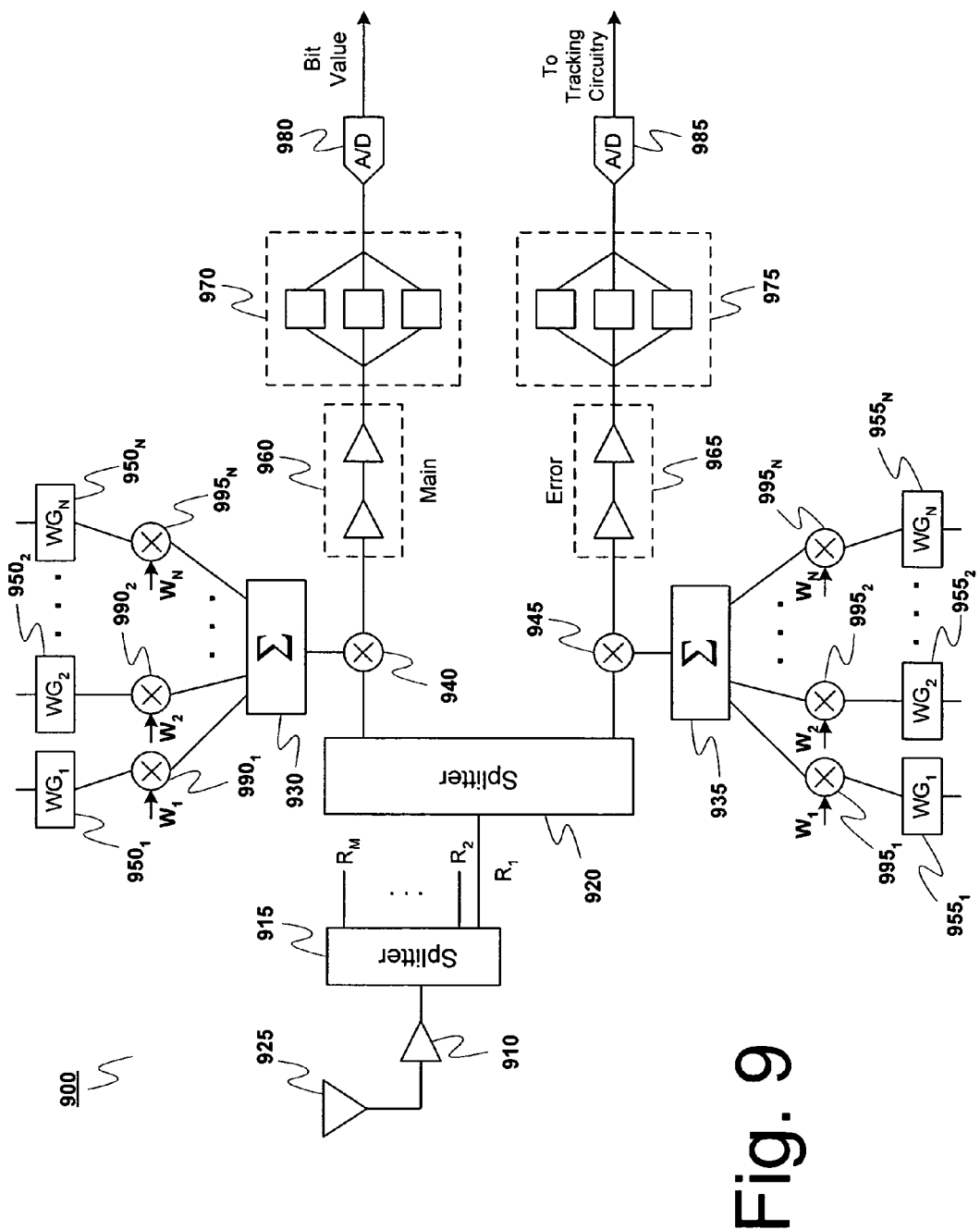
FIG. 9 is a block diagram showing a rake receiver according to a preferred embodiment of the present invention.

FIG. 9 is a block diagram showing a raking receiver according to a preferred embodiment of the present invention. As shown in FIG. 9, the rake receiver 900 includes an antenna 925, a front end 910, a first splitter 915, a second splitter 920, a main summer 930, an error summer 935, a main mixer 940, an error mixer 945, first through $N^{th}$ main wavelet forming networks (wave-generators) $950_1$-$950_N$, first through N h error wave-generators $955_1$-$955_N$, a main amplifier chain 960, an error amplifier chain 965, a main integrate-hold-dump (IHD) integrator 970, an error IHD integrator 975, a main analog-to-digital converter (ADC) 980, an error ADC 985, first through $N^{th}$ main weighting mixers $990_1$-$990_N$, and first through $N^{th}$ error weighting mixers $995_1$-$995_N$. N can be any integer value greater than 1, and is preferably between 2 and 32.

The first splitter 915 operates to split the incoming signal into multiple raking channels $R_1$-$R_M$, which will each be split by the second splitter 920 into an error and a main path. By way of example, FIG. 9 discloses the operation of the rake receiver on the first rake channel $R_1$. The other channels are like the first. This is effectively a cross between FIG. 4 and FIG. 7, where each channel in FIG. 4 is now comprised of a channel as shown in FIG. 7, to provide greater flexibility in combining the outputs for multiple uses—i.e. Rake, multi-user detection, and equalization.

In the main path of the first rake channel $R_1$, the rake receiver 900 will multiply the incoming signal from the first rake channel $R_1$ with a plurality of wavelets generated by the first through $N^{th}$ main wave-generators $950_1$-$950_N$ and weighted by the first through $N^{th}$ weighting values $W_1$-$W_N$ through the first through $N^{th}$ main weighting mixers $990_1$-$990_N$. In this way the first rake channel $R_1$ correlates a waveform that is a combination of all the weighted wavelets from the first through $N^{th}$ main wave-generators $950_1$-$950_N$.

This correlated signal will then be amplified at the main amplifier chain 960 and then integrated at the maim IHD integrator 970. As noted above with respect to FIG. 4A, the main IHD integrator 970 preferably has three integrators so that one can integrate the current main signal, one can hold the most recent integration to allow it to be output, and one can be dumping (or resetting) the second most recent input value. The main IHD integrator 970 preferably has a switch that goes between the three integrators, cycling through the pattern of integrate, output, and dump for each. In an alternate embodiment is to replace the integrators with a low-pass filter.

The output of the main IHD integrator 970 is then passed to the main ADC 980, which converts the analog signal from the IHD integrator 970 to a digital value that can be used by later circuitry.

The error channel preferably operates in a manner essentially identical to the main channel. It has first through $N^{th}$ error wave-generators $955_1$-$955_N$, which are weighted by the first through $N^{th}$ weighting values $W_1$-$W_N$ through the first through $N^{th}$ error weighting mixers $995_1$-$995_N$. Although in this embodiment the weighting values $W_1$-$W_N$ provided to the first through $N^{th}$ error weighting mixers $995_1$-$995_N$ are the same weighting values $W_1$-$W_N$ provided to the first through $N^{th}$ main weighting mixers $990_1$-$990_N$, in alternate embodiments they need not be. The error channel can also be used to support M-ary PSK, or M-ary QAM.

The error signal will then be passed through the error amplifier chain 965, the error SDH integrator 975, and the error ADC 985, in a manner analogous to the main channel described above.

In this preferred embodiment the main ADC 980 performs the bi-phase demodulation for the raking receiver 900, i.e., the sign of the output of the main ADC 980 determines the sign of the input bit. In alternate embodiments, however, other kinds of bit detectors could be used. For example, the device could use an amplitude modulation detector. Or the entire channel could be made complex so that instead of it being a single channel, it could have real and imaginary components. In this case, the incoming signal would have to be processed as a complex waveform.

Figure 10A:
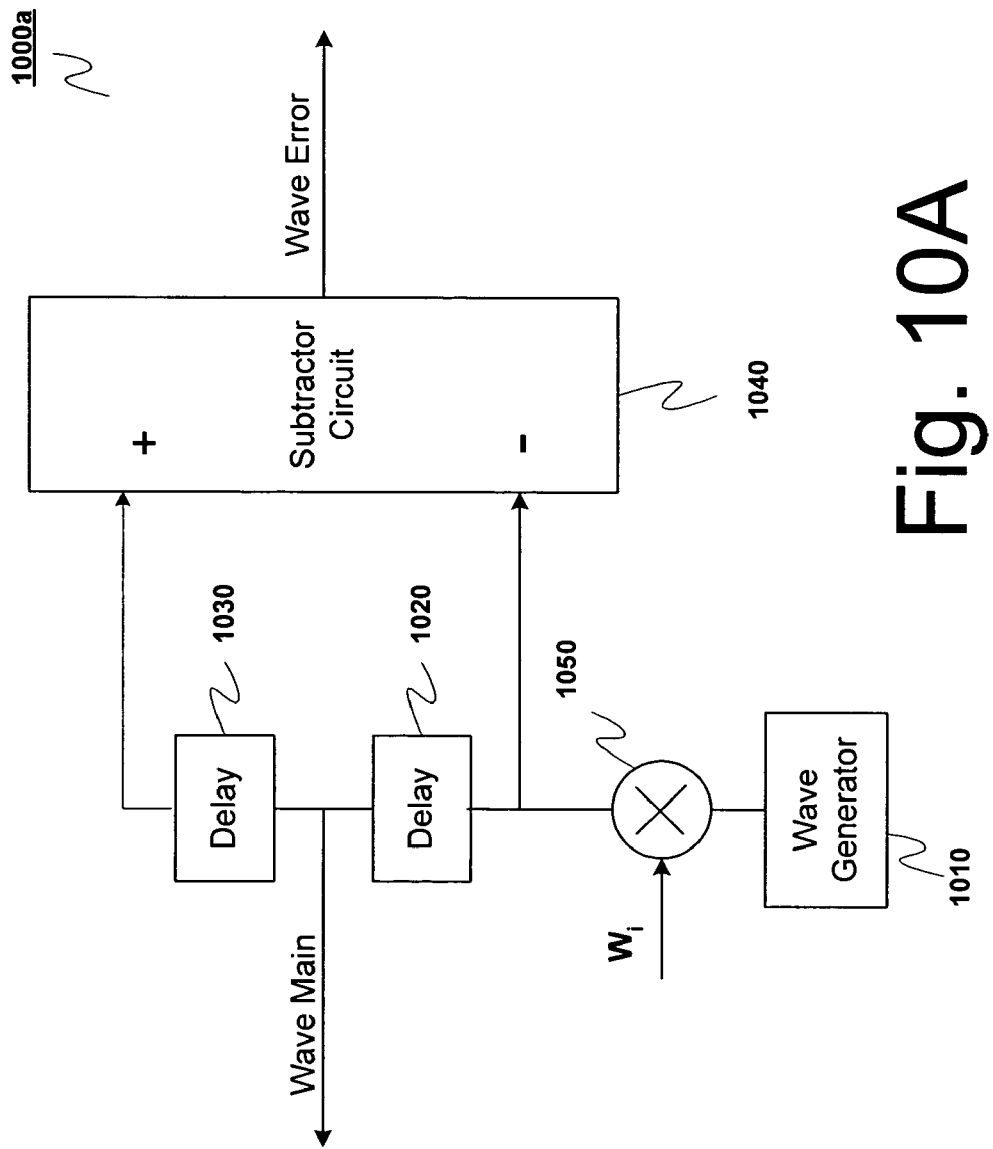
FIGS. 10A and 10B are block diagrams of combined wave-generator and weighting circuits according to preferred embodiments of the present invention.
Figure 10B:
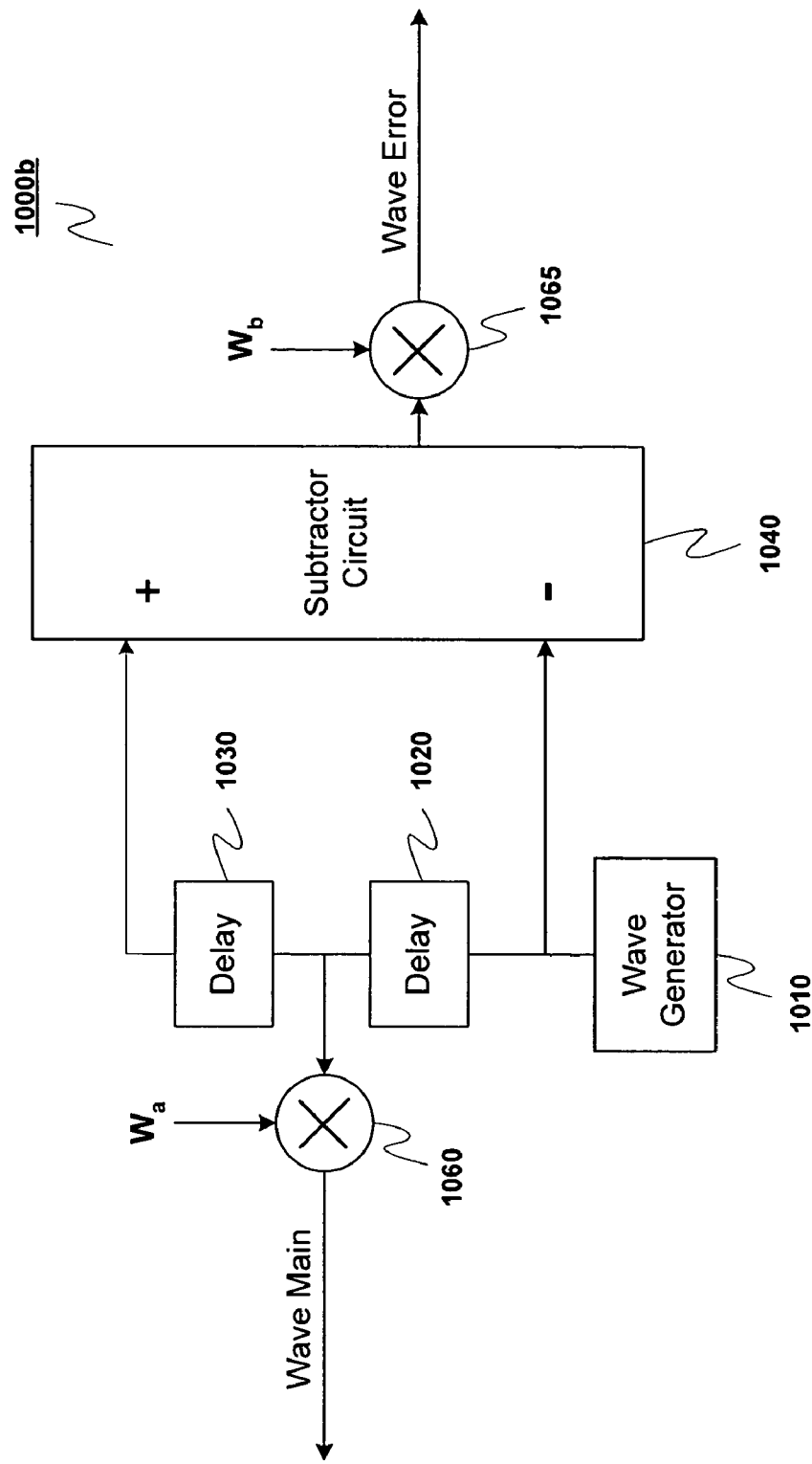

In some preferred embodiments, the main wave-generators $950_1$-$950_N$ and the error wave-generators $955_1$-$955_N$ are provided as the same circuitry, but with different outputs. FIGS. 10A and 10B are block diagrams of combined wave-generator and weighting circuits according to preferred embodiments of the present invention. As shown in FIG. 10A, one embodiment of a combined wave-generator and weighting circuit 1000a includes a simple wave-generator 1010, a first delay 1020, a second delay 1030, a subtractor circuit 1040, and a weighting mixer 1050.

The simple wave-generator 1010 creates a wavelet. This wavelet is then put through the first and second delays 1020 and 1030 to provide an early value (before either delay 1020, 1030), a middle value (after the first delay 1020, but before the second delay 1030), and a late value (after both delays 1020, 1030).

The subtractor circuit 1040 subtracts the early value from the late value to get the wavelet for the error channel. The middle value is used as the wavelet for the main channel.

The weighting mixer 1050 applies the weight W to the early value of the wavelet before it is sent through the first or second delay 1020, 1030, and before the subtractor circuit 1040 receives the non-delayed wavelet.

Thus, the combined wave-generator 1000 of FIG. 10 produces the weighted wavelets used for both the main channel and the error channel (i.e., it serves as main wave-generator $950_1$-$950_N$ and error wave-generator $955_1$-$955_N$, as well as main and main weighting mixers main weighting mixers $990_1$-$990_N$ and error weighting mixers error weighting mixers $995_1$-$995_N$).

As shown in FIG. 10B, another embodiment of a combined wave-generator and weighting circuit 1000a includes a simple wave-generator 1010, a first delay 1020, a second delay 1030, a subtractor circuit 1040, a main weighting mixer 1060, and an error weighting mixer 1065.

The simple wave-generator 1010, first delay 1020, second delay 1030, and subtractor circuit 1040 operate as described with respect to FIG. 10A.

The main weighting mixer 1060 applies the main weight $W_a$ to the middle value wavelet (i.e., the wavelet after it has passed through the first delay 1020, but before it has passed through the second delay 1030). The error weighting mixer 1065 applies the error weight $W_b$ to the output of the subtractor circuit 1040.

Preferably the main weight $W_a$ and the error weight $W_b$ are the same, but in alternate embodiments they may vary by a small amount according to the dynamic range of the circuits being driven.

Thus, the combined wave-generator and weighting circuit 1000a, 1000b of FIGS. 10A and 10B produces the weighted wavelets used for both the main channel and the error channel (i.e., it serves as main wave-generator $950_1$-$950_N$ and error wave-generator $955_1$-$955_N$, as well as main and main weighting mixers main weighting mixers $990_1$-$990_N$ and error weighting mixers error weighting mixers $995_1$-$995_N$).

Figure 11:
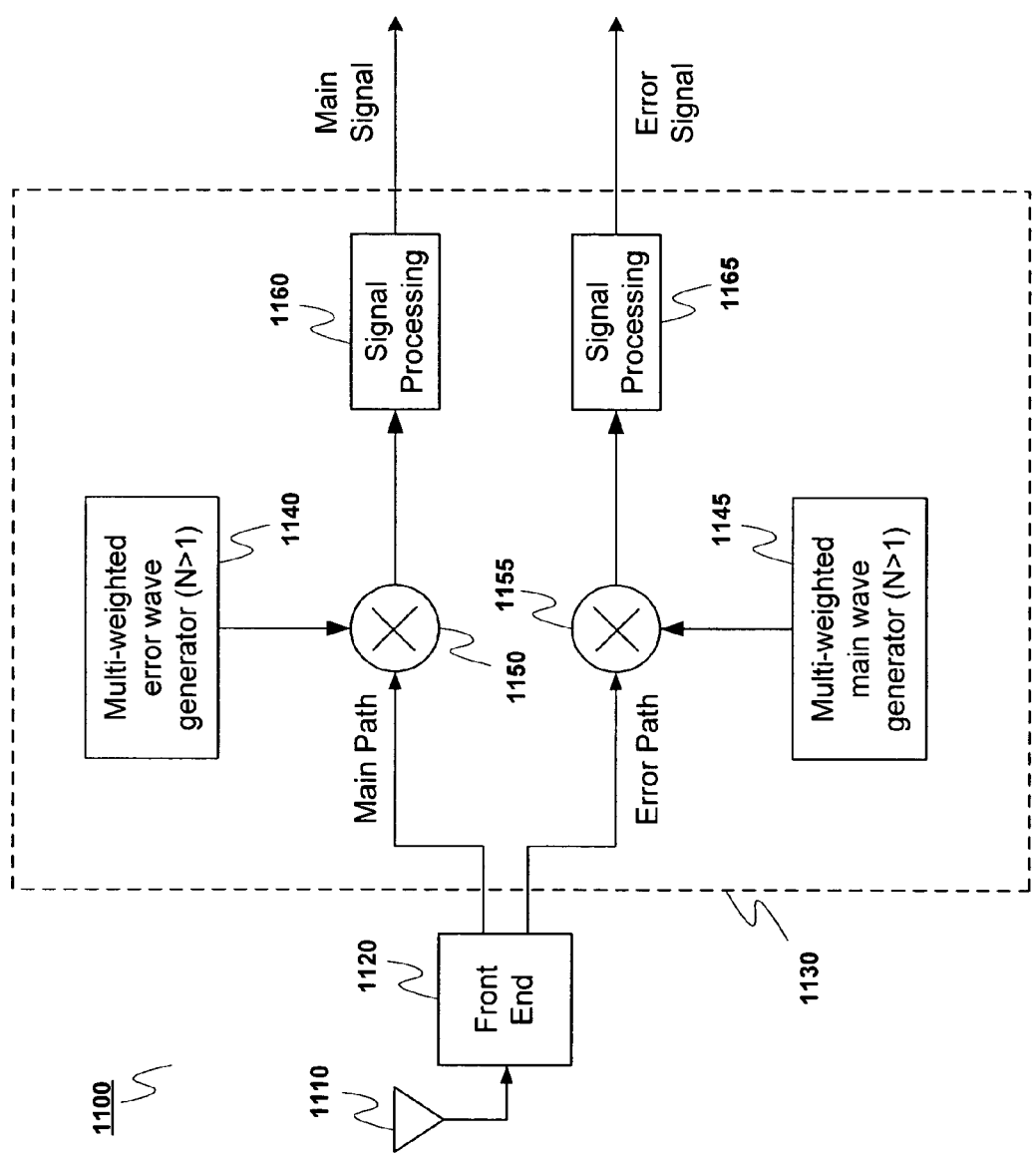
FIG. 11 is a top-level block diagram of a raking system according to a preferred embodiment of the present invention.

FIG. 11 is a top-level block diagram of a raking system according to a preferred embodiment of the present invention. As shown in FIG. 11, the raking system 1100 includes an antenna 1110, a front end 1120, and a raking receiver 1130. The raking receiver 1130 includes a main path multi-weighted error wave-generator 1140, an error path multi-weighted error wave-generator 1145, a main path mixer 1150, an error path mixer 1155, and a main path signal processing block 1160, and an error path signal processing block 1165.

The antenna 1110 receives an incoming signal and passes it through the front end 1120, which performs some signal processing and splits the signal into a main and error path. The main multi-weighted wave-generator 1140 produces a main correlation wavelet for correlating the main signal, while the error multi-weighted wave-generator 1145 produces an error correlation wavelet for correlating the error signal. Preferably the main and error wave-generators 1140 and 1145 each generate, weight, and sum N separate initial wavelets to produce their respective correlation wavelets (where N is an integer greater than one).

The main path and error path mixers 1150 and 1155 mix the incoming signal from the front end 1120 with the relevant main or error correlation wavelets from the main and error multi-weighted wave-generators 1140 and 1145 to produce main and error correlation signals. The signal processing block then performs signal processing (e.g., integration and analog-to-digital conversion) to produce a final correlation value.

Figure 12:
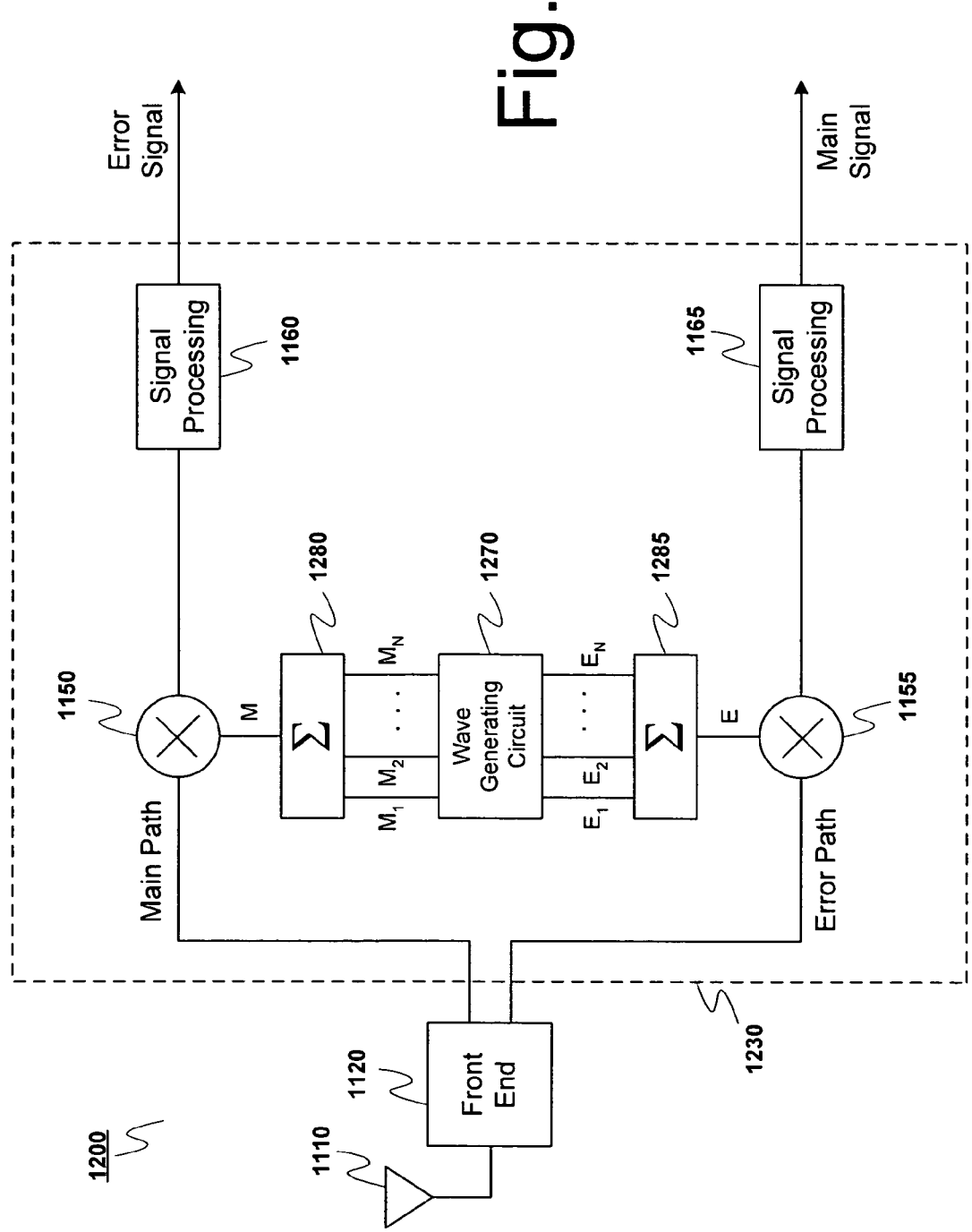
FIG. 12 is a top-level block diagram of a raking system according to another preferred embodiment of the present invention.

FIG. 12 is a top-level block diagram of a raking system according to another preferred embodiment of the present invention. As shown in FIG. 12, the raking system 1200 includes an antenna 1110, a front end 1120, and a raking receiver 1230. The raking receiver 1230 includes a main path mixer 1150, an error path mixer 1155, a main path signal processing block 1160, an error path signal processing block 1165, a wave-generator circuit 1270, a main summer 1280, and an error summer 1285.

FIG. 12 clearly shows that a single wave-generator (or array of wave-generators) can be used to drive both the main and the error channels. This wave-generator circuit 1270 could be implemented as an array of the wave-generators as shown in FIG. 10A or 10B.

The antenna 1110, front end 1120, main path mixer 1150, error path mixer 1155, main path signal processing block 1160, and error path signal processing block 1165 operate as noted above with respect to FIG. 11.

The wave-generator produces a plurality of weighted main wavelets $M_1$-$M_N$ and a plurality of error wavelets $E_1$-$E_N$. The weighted main wavelets $M_1$-$M_N$ are summed at the main summer 1280 to produce a combined main wavelet M that is provided to the main path mixer 1150. Similarly, the weighted error wavelets $E_1$-$E_N$ are summed at the error summer 1285 to produce a combined error wavelet E that is provided to the error path mixer 1155.

Multiple Raking Receiver

Figure 13:
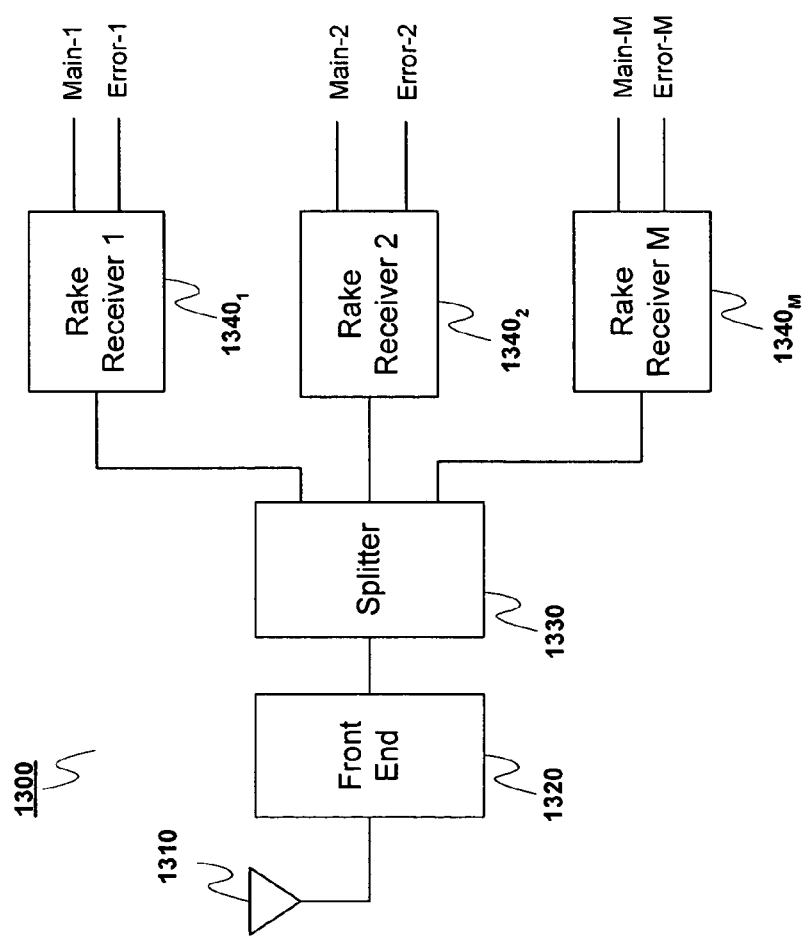
FIG. 13 is a block diagram of a multiple rake receiver according to a preferred embodiment of the present invention.

FIG. 13 is a block diagram of a multiple rake receiver according to a preferred embodiment of the present invention. As shown in FIG. 13, the multiple rake receiver includes an antenna 1310, a front end 1320, a splitter 1330, and M Rake Receivers $\mathbf{1340}_1$ to $\mathbf{1340}_M$. In one embodiment the raking receivers $\mathbf{1340}_1$ to $\mathbf{1340}_M$ are formed as the raking receiver 1230 in FIG. 12.

The antenna 1310 receives a signal; the front end 1320 performs initial signal processing on the signal; and the splitter 1330 then splits the processed signal into M copies that are sent to the M raking receivers $\mathbf{1340}_1$ to $\mathbf{1340}_N$, each of which produces a main and an error signal (main-1, error-1, main-2, error-2, . . . , main-M, and error-M).

Figure 14:
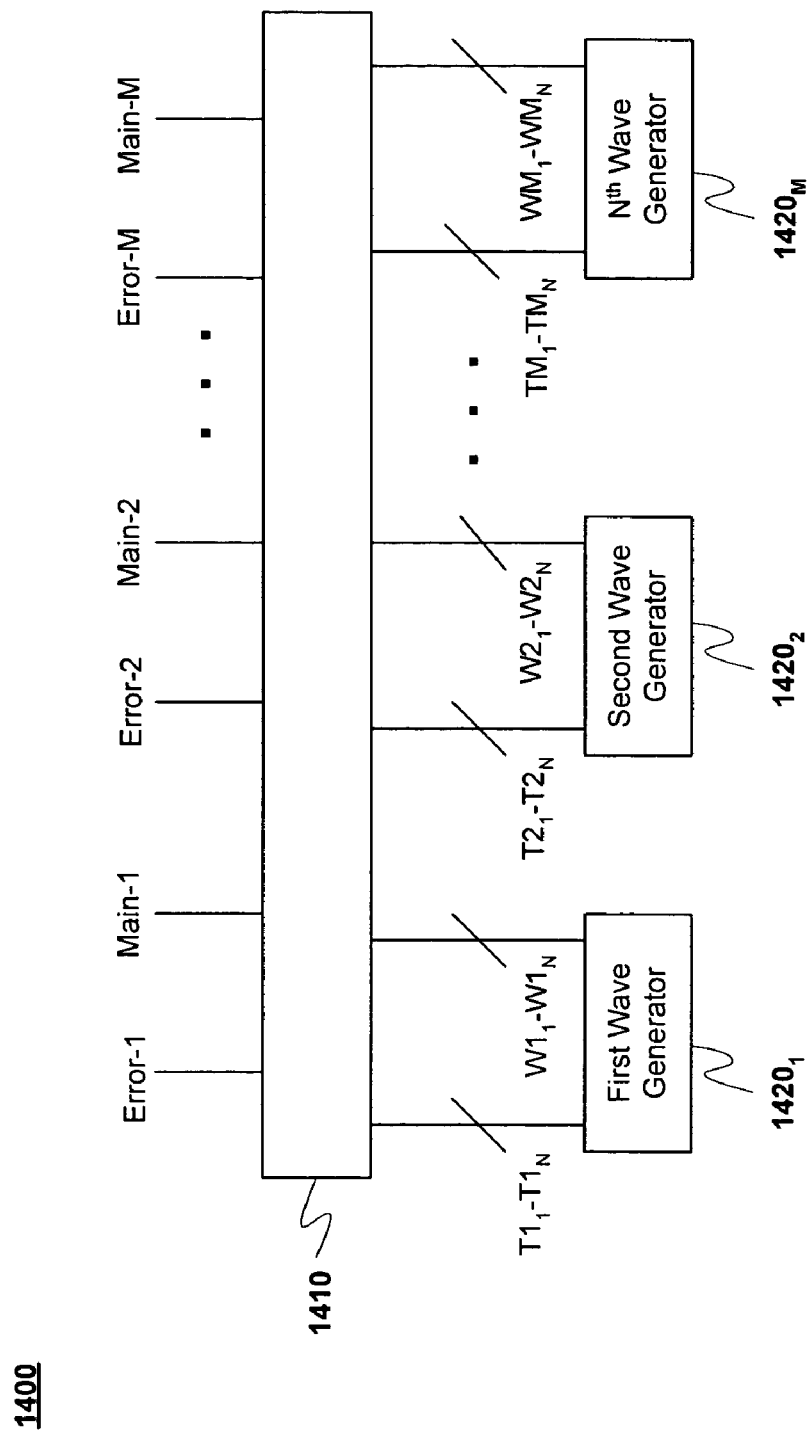
FIG. 14 is a block diagram of a controller and wave-generator system for use in the multiple rake receiver of FIG. 13.

FIG. 14 is a block diagram of a controller and wave-generator system for use in the multiple rake receiver of FIG. 13. As shown in FIG. 14, the controller and wave-generator system 1400 includes a controller 1410 and M wave-generator circuits $\mathbf{1420}_1$ to $\mathbf{1420}_M$.

The controller 1410 receives all of the main and error signals (main-1, error-1, main-2, error-2, . . . , main-M, and error-M) from each of the M raking receivers $\mathbf{1340}_1$ to $\mathbf{1340}_N$ in FIG. 13. Based on these signals, the controller 1410 produces control signals for the M wave-generator circuits $\mathbf{1420}_1$ to $\mathbf{1420}_M$, which are formed in the M raking receivers $\mathbf{1340}_1$ to $\mathbf{1340}_N$, respectively. Each of the M wave-generator circuits $\mathbf{1420}_1$ to $\mathbf{1420}_M$ requires N weight values (e.g., $W1_1$-$W1_N$ for the first wave-generator circuit $\mathbf{1420}_1$) and N timing signals (e.g., $T1_1$-$T1_N$ for the first wave-generator circuit $\mathbf{1420}_1$), assuming that the wave-generator has N separate channels. Thus, the controller 1410 must generate (M×N) timing signals and (M×N) weight values.

FIG. 15 is a flow chart of a raking method according to a preferred embodiment of the present invention. As shown in FIG. 15, the process begins when a receiver receives a plurality of signals. (Step 1505) The receiver then performs amplification and filtering on the signal (Step 1510), and splits that signal into error path and main path signals. (Step 1515)

In the main path, the receiver generates a plurality of main correlation wavelets (Step 1520); weights each of those main correlation wavelets (Step 1525); sums all of those weighted main wavelets together (Step 1530); and correlates that sum of weighted main wavelets with the incoming signal that is coming from the antennae. (Step 1535) After the incoming signal and the sum of weighted main wavelets are correlated, the receiver detects and outputs a main value. (Step 1540) That main value can then be fed into a processor to control a wave-generator used to perform steps 1520, 1525, 1550, and 1555 for later incoming bits. (Step 1545)

In a preferred embodiment the main value is a bit value of a current incoming bit. In this embodiment the bit value can be detected by examining the polarity of the main correlation between the incoming signal and the sum of weighted main wavelets. In alternate embodiments, however, the main value can be determined in other ways.

In the error path, the receiver generates a plurality of error correlation wavelets (Step 1550); weights each of those error correlation wavelets (Step 1555); sums all of those weighted error wavelets together (Step 1560); and correlates that sum of weighted error wavelets with the incoming signal that is coming from the antennae. (Step 1565) After the incoming signal and the sum of weighted error wavelets are correlated, the receiver detects and outputs an error value. (Step 1570) That error value can then be fed into a processor to control a wave-generator used to perform steps 1520, 1525, 1550, and 1555 for later incoming bits. (Step 1575)

In alternate embodiments, steps 1510, 1545, and 1575 can be eliminated.

In steps 1520 and 1550, the plurality of main wavelets can be independently timed with respect to the plurality of error wavelets, or the two sets of wavelets can be timed in synchronization.

In steps 1525 and 1555, the weights of corresponding main and error wavelets can be the same or they can be varied.

In step 1535, the correlation of the sum of weighted main wavelets with the incoming signal includes mixing the sum of weighted main wavelets with the main path signal that comes from the antennae and then integrating that resulting signal over the bit interval using an integrator. In alternate embodiments a sample-hold could be used in place of an integrator.

Similarly, in step 1565, the correlation of the sum of weighted error wavelets with the incoming signal includes mixing the sum of weighted error wavelets with the main path signal that comes from the antennae and then integrating that resulting signal over the bit interval using an integrator. In alternate embodiments a sample-hold could be used in place of an integrator.

In step 1570, eight-bit analog-to-digital converter may perform the detection. The output main value could be one bit, which is just a sign bit. However, in alternate embodiments the output main value could be K bits, an amplitude modulation (AM) detector, or any such signal.

In alternate embodiments the multiple channels could be complex so they each have real and imaginary portions. This would require any detection circuits be quadrature phase. In this case they could be M-ary phase, or a combination of AM and phase. Any suitable detectors could be used, however.

Multiple Wavelets for Bits

In each of the wave-generators disclosed above, multiple wavelets can be used for a single bit. In this case a wavelet code would be transmitted for each bit. In this case a receiving antenna would receive a sequence of wavelets that matches that code for each bit. The wave-generators in the receiver would then generate a series of wavelets replicating that code sequence instead of just a single wavelet.

Feedback

The various disclosed systems and methods can also use feedback. For example, a processor can have available to it a string of bits (i.e. a history of bits) starting at the current bit and going back to a certain number of previous bits. The processor can then use this string of bits to determine the proper weighting values to send to the wave-generators in the receiver.

And if it chooses the proper weighting values, the receiver can cancel out other users. In the alternative, the receiver could cancel out one bit that falls on top of another bit so that even though the number of multi-path components being received was high, and many incoming signals were interfering with each other, the processor could set the weighting values to cancel out the bits that it is not looking for.

Also, just as it can cancel out undesired bits, the receiver may be able to cancel out undesired users in a multiple user system. If a first user employs a first code and a second user employs a second code, a system that has multiple weighted wave-generators can set some of the wave-generators to the first code, set some of the wave-generators to the second code, reverse the polarity of the weighting values for one of the users to null their incoming signal. (This can be done to cancel out any number of undesired users, provided that the receiver has sufficient wave-generators. Thus, for example, when the receiver is trying to receive signals from the first user, it can cancel out signals from the second user, and when it is trying to receive signals from the second user, it can cancel out signals from the first user.

Obviously, numerous modifications and variations of the present invention are possible in light of the above teachings. It is therefore to be understood that within the scope of the appended claims, the invention may be practiced otherwise than as specifically described herein.

I claim:

1. A raking receiver in a wireless network, comprising:
    an antenna for receiving an incoming signal;
    first through $N^{th}$ main path wavelet forming networks for producing first through $N^{th}$ locally generated main wavelets, respectively;
    first through $N^{th}$ main path weighting mixers for multiplying the first through $N^{th}$ locally generated main wavelets by first through $N^{th}$ main weighting values, respectively, to produce first through $N^{th}$ main weighted wavelets;
    a main path summer for adding together the first through $N^{th}$ main weighted wavelets to produce a weighted main correlation input signal;
    a main path mixer for multiplying the incoming signal with the weighted main correlation input signal to produce a main correlated signal; and
    a main path signal processing circuit for receiving the main correlated signal and producing a digital bit value, wherein N is an integer greater than 1.

2. A raking receiver in a wireless network, as recited in claim 1, wherein the main path signal processing circuit further comprises: a main path filtering circuit for filtering the main correlated signal to produce a main filtered signal.

3. A raking receiver in a wireless network, as recited in claim 2, wherein the main path signal processing circuit further comprises: a main path analog-to-digital converter for converting the main filtered signal to a digital bit value.

4. A raking receiver in a wireless network, as recited in claim 2, wherein the main path signal processing circuit further comprises: a main path amplifier chain for amplifying the main correlated signal before it is provided to the main path filtering circuit.

5. A raking receiver in a wireless network, as recited in claim 1, wherein the main path signal processing circuit further comprises: a main path integrating circuit for integrating the main correlated signal to produce a main integrated signal.

6. A raking receiver in a wireless network, as recited in claim 5, wherein the main path signal processing circuit further comprises: a main path analog-to-digital converter for converting the main integrated signal to a digital bit value.

7. A raking receiver in a wireless network, as recited in claim 5, wherein the main path signal processing circuit further comprises: a main path amplifier chain for amplifying the main correlated signal before it is provided to the main path integrating circuit.

8. A raking receiver in a wireless network, as recited in claim 5, wherein the main path integrating circuit further comprises:
    a first integrator;
    a second integrator;
    a third integrator;
    an input switch that can select one of the first, second, and third integrators to connect to the main path mixer; and
    an output switch that can select one of the first, second, and third integrators to connect to a main path analog-to-digital converter,
    wherein for every integration period, the input switch selects one of the first, second, and third integrators as an integrating integrator to integrate the main correlated signal, the output switch selects one of the first, second, and third integrators as a holding integrator to output the main integrated signal, and one of the first, second, and third integrators operates as a dumping integrator to dump any information it had previously stored, and
    wherein for every integration period, the integrating, holding and dumping integrators are each different ones of the first, second, and third integrators.

9. A raking receiver in a wireless network, as recited in claim 1, wherein phases of each of the first through $N^{th}$ locally generated main wavelets can be independently varied by the first through $N^{th}$ main path wavelet forming networks, respectively.

10. A raking receiver in a wireless network, as recited in claim 1, further comprising:
    first through $M^{th}$ error path wavelet forming networks for producing first through $M^{th}$ locally generated error wavelets, respectively;
    first through $M^{th}$ error path weighting mixers for multiplying the first through $M^{th}$ locally generated error wavelets by first through $M^{th}$ error weighting values, respectively, to produce first through $M^{th}$ error weighted wavelets;
    an error path summmer for adding together the first through $M^{th}$ error weighted wavelets to produce a weighted error correlation input signal;

an error path mixer for multiplying the incoming signal with the weighted error correlation input signal to produce an error correlated signal; and an error path signal processing circuit for receiving the error correlated signal and producing a digital error-tracking signal, wherein M is an integer greater than 1.

11. A raking receiver in a wireless network, as recited in claim 10, wherein the error path signal processing circuit further comprises: an error path filtering circuit for filtering the error correlated signal to produce an error filtered signal.

12. A raking receiver in a wireless network, as recited in claim 11, wherein the error path signal processing circuit further comprises: an error path analog-to-digital converter for converting the error filtered signal to a digital bit value.

13. A raking receiver in a wireless network, as recited in claim 11, wherein the error path signal processing circuit further comprises: an error path amplifier chain for amplifying the error correlated signal before it is provided to the error path filtering circuit.

14. A raking receiver in a wireless network, as recited in claim 10, wherein the error path signal processing circuit further comprises: an error path integrating circuit for integrating the error correlated signal to produce an error integrated signal.

15. A raking receiver in a wireless network, as recited in claim 14, wherein the error path signal processing circuit further comprises: an error path analog-to-digital converter for converting the error integrated signal to the digital error-tracking signal.

16. A raking receiver in a wireless network, as recited in claim 14, wherein the error path signal processing circuit further comprises: an error path amplifier chain for amplifying the error correlated signal before it is provided to the error path integrating circuit.

17. A raking receiver in a wireless network, as recited in claim 15, wherein the error path integrating circuit further comprises:

a first integrator;
a second integrator;
a third integrator;
an input switch that can select one of the first, second, and third integrators to connect to the error path amplifier chain; and
an output switch that can select one of the first, second, and third integrators to connect to the error path analog-to-digital converter,
wherein for every integration period, the input switch selects one of the first, second, and third integrators as a sample integrator to sample the error amplified signal, the output switch selects one of the first, second, and third integrators as a hold integrator to output the error integrated signal, and one of the first, second, and third integrators operates as a dump integrator to dump any information it had previously stored, and
wherein for every integration period, the sample, hold and dump integrators are each different ones of the first, second, and third integrators.

18. A raking receiver in a wireless network, as recited in claim 10, wherein phases of each of the first through $M^{th}$ error wavelets can be independently varied by the first through $M^{th}$ error path wavelet forming networks, respectively.

19. A raking receiver in a wireless network, as recited in claim 10, wherein M is equal to N.

20. A raking receiver in a wireless network, comprising:
an antenna for receiving an incoming signal;
a wavelet forming circuit for producing first through $N^{th}$ weighted main wavelets and first through $N^{th}$ weighted error wavelets;
a main path summer for adding together the first through $N^{th}$ weighted main wavelets to produce a main correlation input signal;
an error path summer for adding together the first through $N^{th}$ weighted error wavelets to produce an error correlation input signal;
a main path mixer for multiplying the incoming signal with the main correlation input signal to produce a main correlated signal;
an error path mixer for multiplying the incoming signal with the error correlation input signal to produce an error correlated signal;
a main path signal processing circuit for receiving the main correlated signal and producing a digits bit value; and
an error path signal processing circuit for receiving the error correlated signal and producing a digital error-tracking signal,
wherein N is an integer greater than 1.

21. A raking receiver in a wireless network, as recited in claim 20, wherein the main path signal processing circuit further comprises:
a main path amplifier chain for amplifying the main correlated signal to produce a main amplified signal;
a main path integrator circuit fOr integrating the main amplified signal to produce a main integrated signal; and
a main path analog-to-digital converter for converting the main integrated signal to the digital bit value.

22. A raking receiver in a wireless network, as recited in claim 21, wherein the main path integrator circuit farther comprises:
a first integrator;
a second integrator;
a third integrator;
an input switch that can select one of the first, second, and third integrators to connect to the main path amplifier chain; and
an output switch that can select one of the first, second, and third integrators to connect to the main path analog-to-digital converter,
wherein for every integration period, the input switch selects one of the first, second, and third integrators as a sample integrator to sample the main amplified signal, the output switch selects one of the first, second, and third integrators as a hold integrator to output the main integrated signal, and one of the first, second, and third integrators operates as a dump integrator to dump any information it had previously stored, and
wherein for every integration period, the sample, hold and dump integrators are each different ones of the first, second, and third integrators.

23. A raking receiver in a wireless network, as recited in claim 20, wherein the error path signal processing circuit further comprises:
an error path amplifier chain for amplifying the error correlated signal to produce an error amplified signal;
an error path integrator circuit for integrating the error amplified signal to produce an error integrated signal; and an error path analog-to-digital converter for converting the error integrated signal to the digital error-tracking signal.

24. A raking receiver in a wireless network, as recited in claim 23, wherein the error path integrator circuit further comprises:
a first integrator;
a second integrator;
a third integrator;
an input switch that can select one of the first, second, and third integrators to connect to the error path amplifier chain; and
an output switch that can select one of the first, second, and third integrators to connect to the error path analog-to-digital converter,
wherein for every integration period, the input switch selects one of the first, second, and third integrators as a sample integrator to sample the error amplified signal, the output switch selects one of the first, second, and third integrators as a hold integrator to output the error integrated signal, and one of the first, second, and third integrators operates as a dump integrator to dump any information it had previously stored, and
wherein for every integration period, the sample, hold and dump integrators are each different ones of the first, second, and third integrators.

25. A raking receiver in a wireless network, as recited in claim 20, wherein phases of each of the first through $N^{th}$ weighted error wavelets can be independently varied by the wavelet forming circuit.

26. A method of raking in a wireless network, comprising:
receiving a wireless signal;
generating first through $N^{th}$ locally generated main wavelets;
multiplying the first through $N^{th}$ locally generated main wavelets by first through $N^{th}$ main weighting values, respectively, to produce first through $N^{th}$ main weighted wavelets, respectively,
adding together the first through $N^{th}$ main weighted wavelets to produce a main correlation input signal; and
correlating the main correlation input signal with the received signal to produce a bit value,
wherein N is an integer greater than 1.

27. A method of raking in a wireless network, as recited in claim 26, further comprising:
generating first through $M^{th}$ locally generated error wavelets;
multiplying the first through $M^{th}$ locally generated error wavelets by first through $M^{th}$ error weighting values, respectively, to produce first through $M^{th}$ error weighted wavelets;
adding together the first through $M^{th}$ error weighted wavelets to produce a error correlation input signal; and
correlating the error correlation input signal with the received signal to produce an error-tracking signal,
wherein M is an integer greater than 1.

28. A method of raking in a wireless network, as recited in claim 27, wherein M is equal to N.

* * * * *

UNITED STATES PATENT AND TRADEMARK OFFICE
CERTIFICATE OF CORRECTION

| | | |
|---|---|---|
| PATENT NO. | : 7,292,622 B2 | Page 1 of 1 |
| APPLICATION NO. | : 10/680492 | |
| DATED | : November 6, 2007 | |
| INVENTOR(S) | : John W. McCorkle | |

It is certified that error appears in the above-identified patent and that said Letters Patent is hereby corrected as shown below:

In Column 24, Line 19, Claim No. 20:
    Change "main correlated signal and producing a digits bit value;" to --main correlated signal and producing a digital bit value;--

In Column 24, Line 31, Claim No. 21:
    Change "a main path integrator circuit fOr integrating the main" to --a main path integrator circuit for integrating the main--

In Column 24, Line 37, Claim No. 22:
    Change "wherein the main path integrator circuit farther" to --wherein the main path integrator circuit further--

In Column 26, Line 8, Claim No. 26:
    Change "weighted wavelets, respectively," to --weighted wavelets, respectively;--

Signed and Sealed this

Twenty-ninth Day of July, 2008

JON W. DUDAS
*Director of the United States Patent and Trademark Office*